(12) United States Patent
Koyanaka

(10) Patent No.: US 10,486,106 B2
(45) Date of Patent: Nov. 26, 2019

(54) MEMBRANE ELECTRODE FOR ABSORBING TRITIUM AND METHOD FOR RECOVERING TRITIUM

(71) Applicant: FORWARD SCIENCE LABORATORY CO., LTD., Oita-shi, Oita (JP)

(72) Inventor: Hideki Koyanaka, Oita (JP)

(73) Assignee: FORWARD SCIENCE LABORATORY CO., LTD., Oita (JP)

( * ) Notice: Subject to any disclaimer, the term of this patent is extended or adjusted under 35 U.S.C. 154(b) by 0 days.

(21) Appl. No.: 15/572,246

(22) PCT Filed: Jun. 1, 2016

(86) PCT No.: PCT/JP2016/066315
§ 371 (c)(1),
(2) Date: Nov. 7, 2017

(87) PCT Pub. No.: WO2016/178437
PCT Pub. Date: Nov. 10, 2016

(65) Prior Publication Data
US 2018/0126335 A1    May 10, 2018

(30) Foreign Application Priority Data

Sep. 8, 2015 (JP) ................. 2015-177072
Mar. 22, 2016 (JP) ................. 2016-057034

(51) Int. Cl.
| | | |
|---|---|---|
| *B01D 59/26* | (2006.01) | |
| *B01J 20/02* | (2006.01) | |
| *G21F 9/12* | (2006.01) | |
| *C01B 4/00* | (2006.01) | |

(52) U.S. Cl.
CPC .......... *B01D 59/26* (2013.01); *B01J 20/0222* (2013.01); *G21F 9/12* (2013.01); *C01B 4/00* (2013.01)

(58) Field of Classification Search
CPC ....................................... B01D 59/26
See application file for complete search history.

(56) References Cited

FOREIGN PATENT DOCUMENTS

| WO | WO-2014153647 A1 * | 10/2014 | ............. B01D 59/30 |
|---|---|---|---|
| WO | WO-2015037734 A1 * | 3/2015 | ............. B01J 20/06 |

* cited by examiner

*Primary Examiner* — Melissa S Swain
(74) *Attorney, Agent, or Firm* — Wenderoth, Lind & Ponack, L.L.P.

(57) ABSTRACT

Tritium is isolated and recovered from tritium-containing water by a membrane electrode including a manganese oxide having a spinel crystal structure and containing hydrogen ions or lithium ions and having one surface coated with a membrane of an ion conductive material.

7 Claims, 10 Drawing Sheets

(a)

(b)

[Fig. 1]
(a)
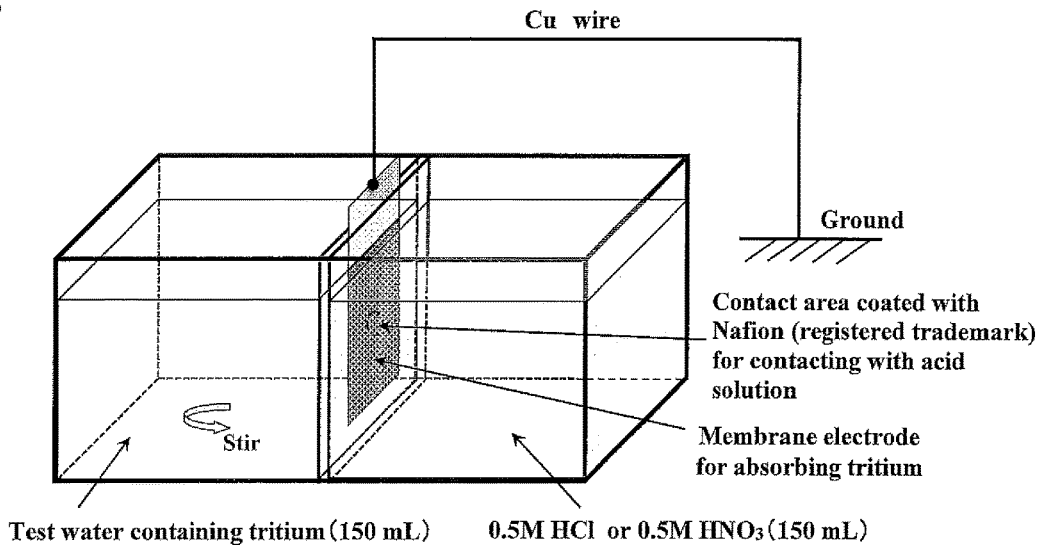
(b)
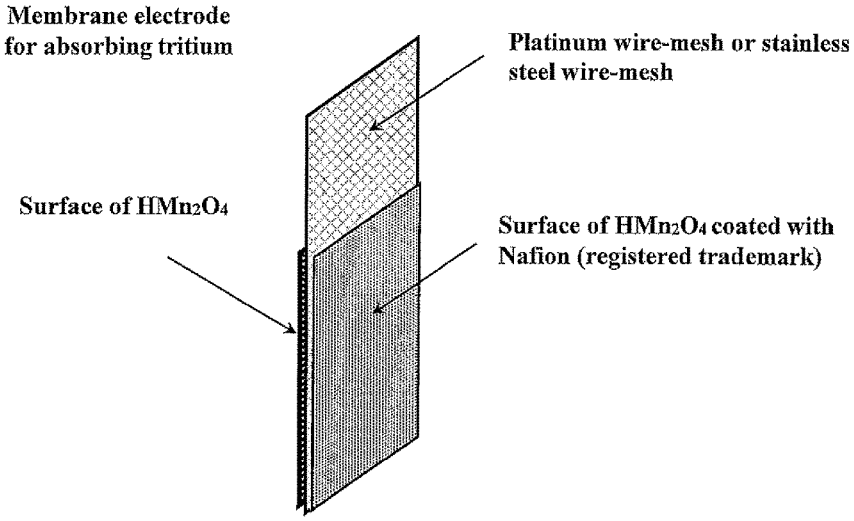

[Fig. 2]
(a)
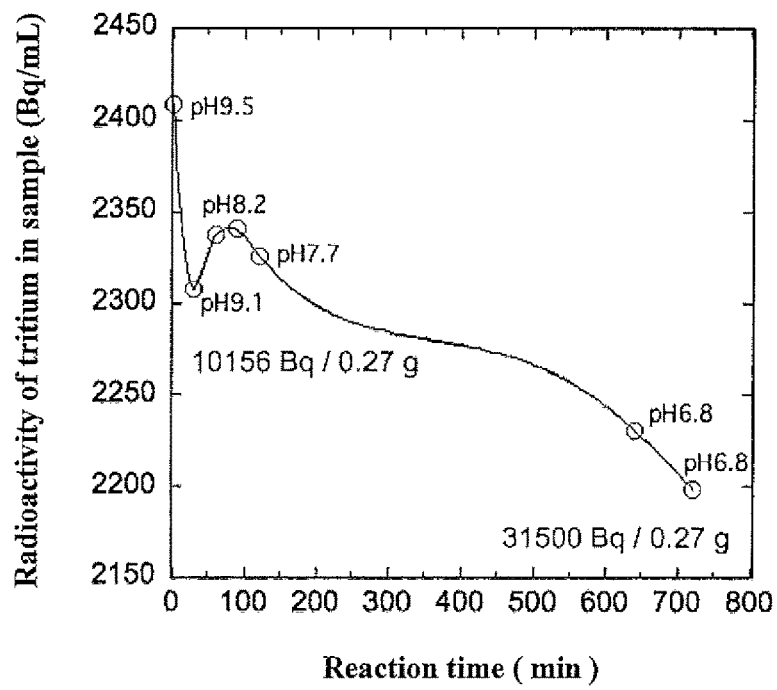
(b)
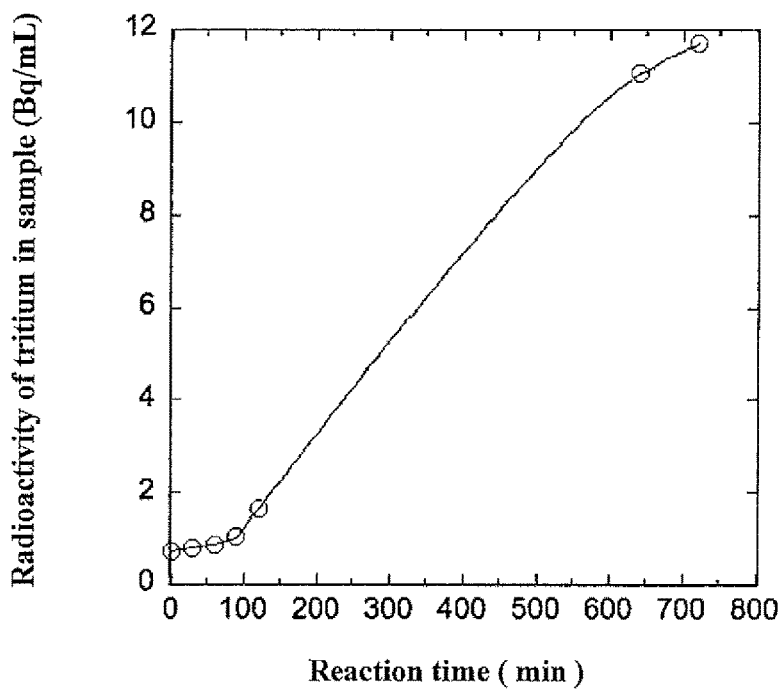

[Fig. 3]
(a)
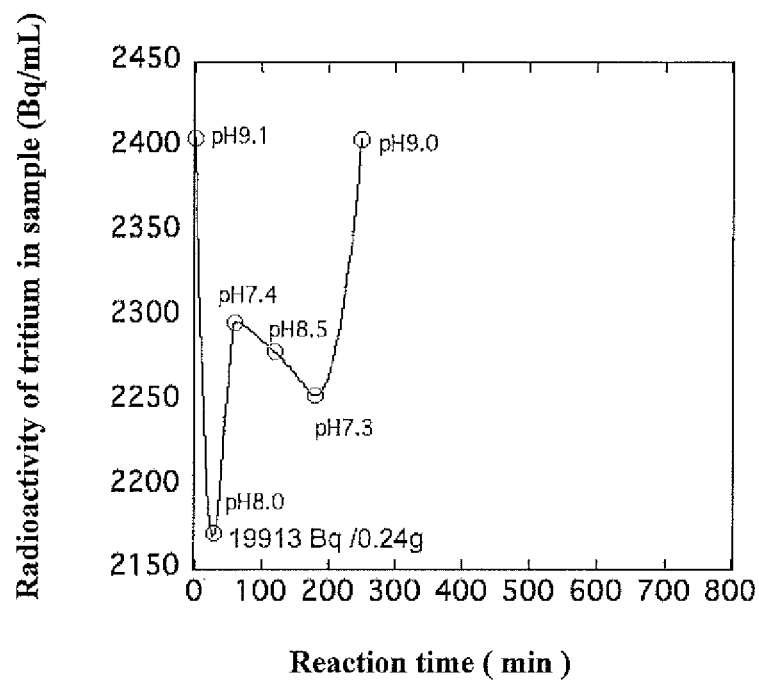
(b)
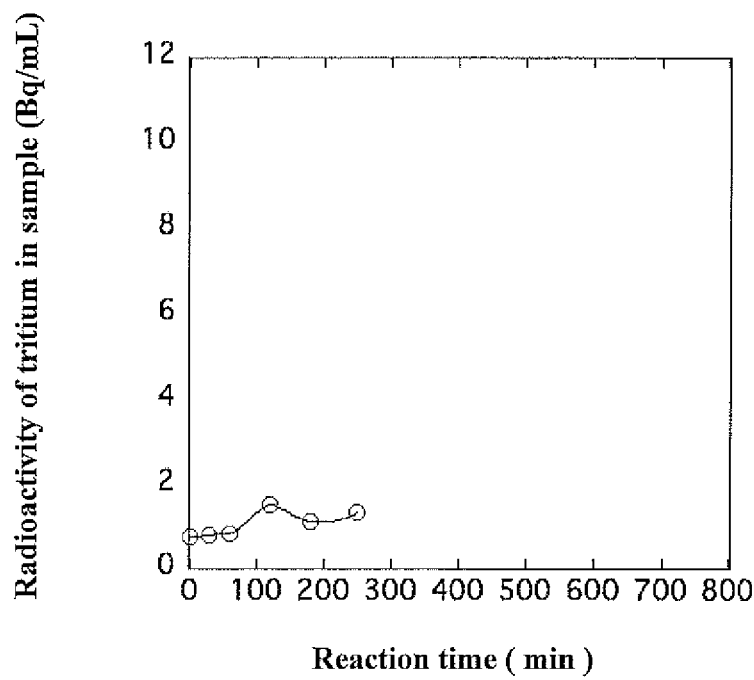

[Fig. 4]
(a)
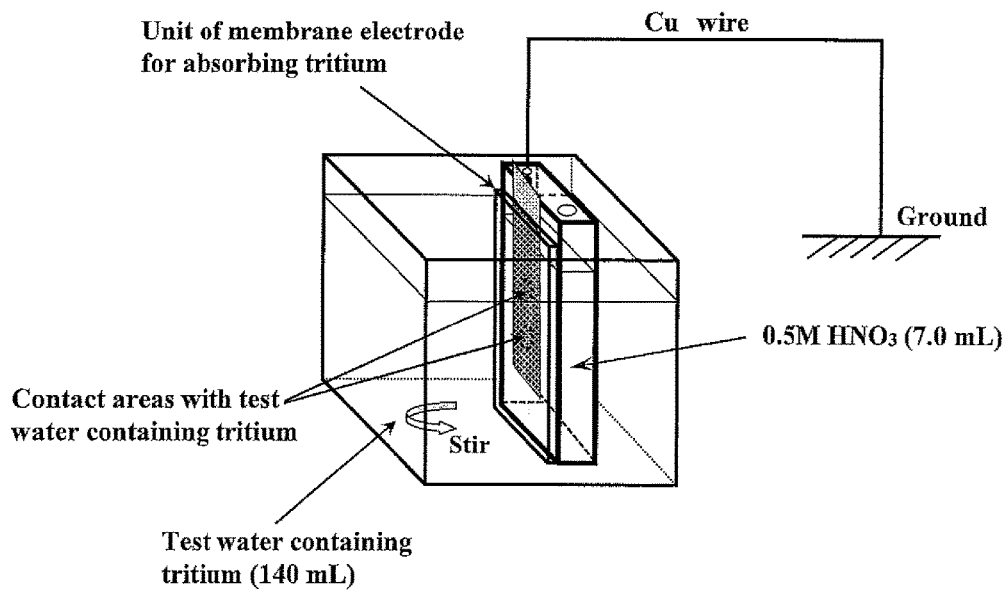
(b)
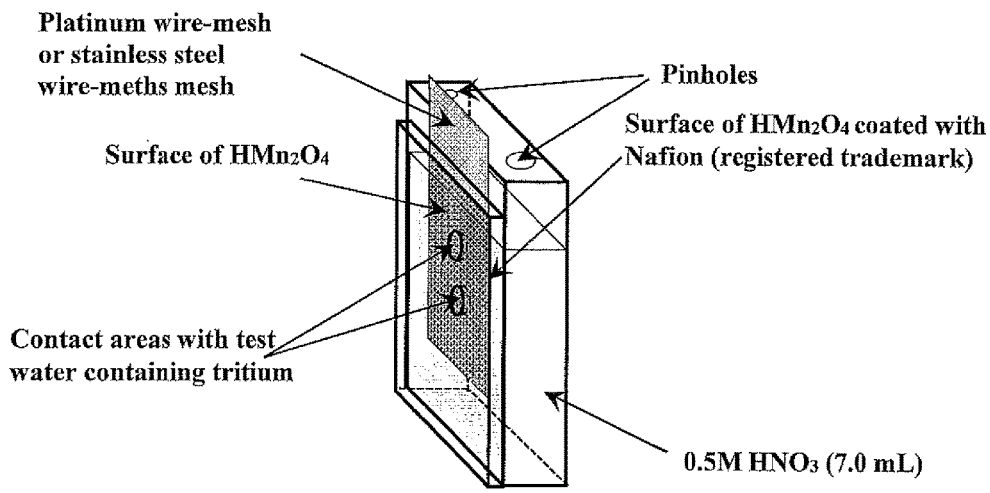

[Fig. 5]
(a)
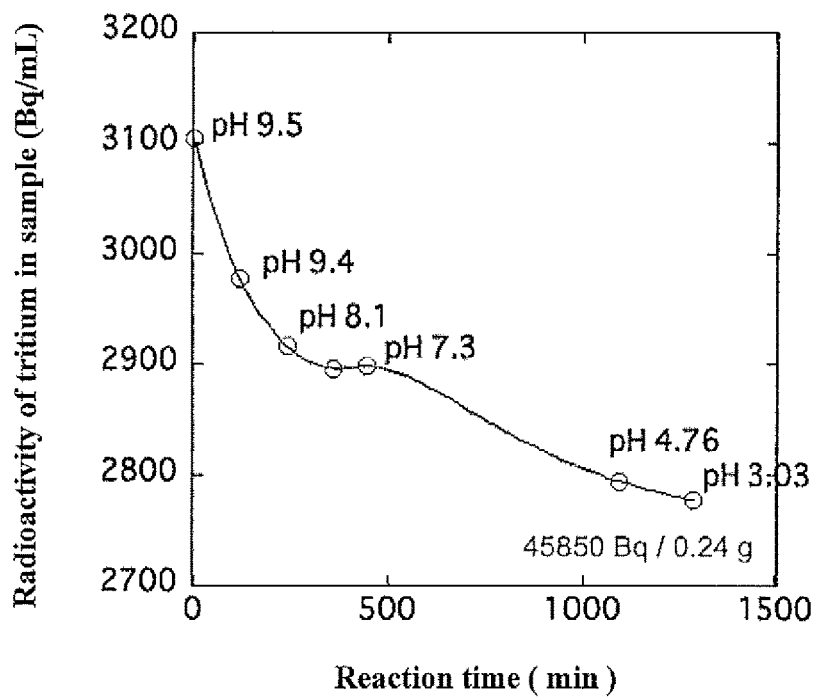
(b)
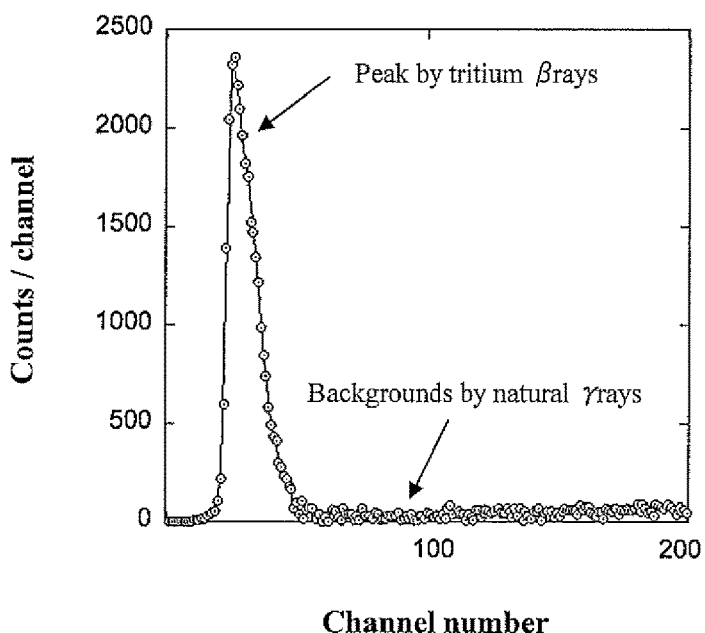

MEMBRANE ELECTRODE FOR ABSORBING TRITIUM AND METHOD FOR RECOVERING TRITIUM

TECHNICAL FIELD

The present invention relates to a membrane electrode for absorbing tritium, and a method for recovering tritium.

BACKGROUND ART

Tritium (T) dissolves in light water ($H_2O$) as isotopomers of water ($T_2O$, HTO). Tritium (T) is an isotope of hydrogen (H), and is a radioactive element that emits β-rays (electron beams) and has a half-life period of 12.3 years. In addition, tritium ions ($T^+$) have chemical properties similar to those of hydrogen ions ($H^+$). Tritium ions ($T^+$) remain in the body as they are exchanged with hydrogen ions ($H^+$), which constitute DNA in the body of a living being. Tritium ions can be a causative agent of internal exposure and are thus harmful.

The natural abundance of tritium is significantly small (one tritium atom per $1 \times 10^{18}$ hydrogen atoms). Tritium is artificially produced at a fission-type nuclear power facility or a nuclear fusion reaction facility. The concentration of tritium in waste water is limited to 60,000 Bq/L (60 Bq/mL), which is the radioactive concentration limit derived from tritium per 1 liter of sample water defined in the Japanese governmental notification for the dose limit and other details under the provisions of the regulations on the installment and operations of commercial power reactors.

High cost, complicated systems are usually needed for separating tritium from water with conventional technologies using their different physical properties including the boiling points of water molecules ($H_2O$) and water isotopomer molecules (HTO, DTO, $T_2O$), mass, or reactivity of hydrogen gas ($H_2$) with high performance platinum catalysts under high temperature conditions. These conventional methods are described, for example, in Vasaru, G., Tritium Isotope separation 1993, CRC Press, Chap. 4-5, Villani, S., Isotope Separation 1976, Am. Nuclear Soc., Chap. 9, Gould, R. F., Separation of Hydrogen Isotopes 1978, Am. Nuclear Soc., Chap. 9.

The inventors of the present application have recently reported that when a manganese oxide having a spinel crystal structure containing hydrogen ions is applied in the form of powder or an electrode to tritium-containing water, tritium can be absorbed from the tritium-containing water into a solid phase of the manganese oxide via ion-exchange of hydrogen ions ($H^+$) and tritium ions ($T^+$), as described in Hideki Koyanaka and Hideo Miyatake, "Extracting tritium from water using a protonic manganese oxide spinel", Separation Science and Technology, 50, 14, 2142-2146, (2015) and WO 2015/037734. This technique enables chemical separation of tritium from water at room temperature by separating the manganese oxide powder adsorbing tritium from water.

SUMMARY OF INVENTION

Technical Problem

However, the recovery of tritium from the manganese oxide powder or the electrode that has absorbed tritium to the outside of the reaction container is very difficult, because the manganese oxide powder or the electrode that has absorbed tritium releases tritium into water in a few minutes to several tens of minutes or to 160 minutes. As a result, the tritium concentrations in the water re-increase and return to the initial concentrations, or to the concentrations before the manganese oxide powder or the electrode is applied. Separating the manganese oxide powder or the electrode that has absorbed a maximum amount of tritium from water in a timely manner is not practically easy.

Tritium is released from the manganese oxide that has absorbed tritium, and the tritium concentration returns to the initial concentration mainly because of insufficient hydrogen ions ($H^+$) contained in the manganese oxide as the tritium absorption progresses in water, according to Hideki Koyanaka and Hideo Miyatake, "Extracting tritium from water using a protonic manganese oxide spinel", Separation Science and Technology, 50, 14, 2142-2146, (2015). If a method for effectively supplying hydrogen ions ($H^+$) to the manganese oxide during the tritium absorption progress is developed, the tritium concentration is expected to decrease continuously.

To supply hydrogen ions ($H^+$) from a dilute hydrochloric acid solution to the manganese oxide, a method of decreasing the tritium concentration in tritium-containing water using an electrode containing manganese oxide, a conductive coating, and a platinum-wire mesh has been tested in a tank partitioned by the electrode between the tritium-containing water and the dilute hydrochloric acid solution, as described in JP patent application 02015/037734 filed by the inventor of the present application. However, the method has not achieved continual decrease in the tritium concentration by preventing the tritium release from the electrode into water.

Moreover, an effective method of recovering tritium from the manganese oxide powder or the electrode that has absorbed tritium out of the reaction container has yet been established.

In view of the above circumstances, an object of the present invention is to provide a membrane electrode that enables inexpensive separation of tritium from water, continual absorption of tritium, and conversion of an isotopomer of water (i.e., HTO: liquid) into an isotopomer of water (i.e., HTO: gas) or an isotopomer of hydrogen gas (i.e., HT: gas), and a method of continuously absorbing tritium using the membrane electrode and a method of continuously recovering tritium from a reaction container to the outside using the membrane electrode while maintaining high absorption and recovery yields.

Solution to Problem

In response to the issue described above, one aspect of the present invention provides a membrane electrode for absorbing tritium that separates tritium from tritium-containing water. The membrane electrode includes hydrogen ion-containing manganese oxide having a spinel crystal structure fixed on a conductive metal surface by conductive coating to form a membrane electrode, and a hydrogen-ion conducting film coated on one side of the membrane electrode.

The method for separating tritium according to the above aspect of the present invention further includes bringing tritium-containing water in contact with the membrane electrode having a pH range from weak acidity to alkalinity while supplying hydrogen ions to the hydrogen-ion conductive film coated on one side of the membrane electrode, to separate and trap tritium ions ($T^+$) from the tritium-containing water.

In the method according to the above aspect, the hydrogen ions are supplied through contacting with a dilute acid aqueous solution. The dilute acid aqueous solution may be a dilute hydrochloric acid solution or a dilute nitric acid solution.

The method for separating tritium from water further includes circulating the tritium-containing water that has been brought into contact with the membrane electrode to absorb tritium to bring the tritium-containing water into contact with the membrane electrode again. The circulation of the tritium-containing water may be carried out until the concentration of radioactivity derived from tritium contained in the tritium-containing water reaches a value equal to or less than a reference value.

Furthermore, a method of recovering tritium according to another aspect of the present invention includes converting tritium collected with the membrane electrode to water molecules (HTO: gas) or hydrogen gas (HT: gas) when water having pH from weak acidity to acidity is brought into contact with the membrane electrode. Such tritium converted to gaseous HTO or HT transpires to the air inside the reaction container. The HT forms HTO in the air by oxidation through contacting with oxygen.

The method of recovering tritium according to the above aspect of the present invention thus includes the recovery of tritium to the outside of the reaction container as gaseous HTO or HT using the membrane electrode that is brought into contact with tritium-containing water. Such gaseous tritium carried from tritium-containing water into the air in the reaction container can be collected into solvents or materials having a capacity to absorb water or hydrogen gas, such as light water ($H_2O$) or porous materials, by air suction or the like.

Advantageous Effects of Invention

According to the above aspects of the present invention, tritium can be separated and recovered inexpensively from water.

BRIEF DESCRIPTION OF DRAWINGS

FIG. 1(a) is a schematic diagram of a reaction system including a membrane electrode for absorbing tritium according to one embodiment, and FIG. 1(b) is a schematic diagram of the membrane electrode for absorbing tritium.

FIG. 2(a) is a graph showing changes in the tritium concentration in samples collected from tritium-containing water using a membrane electrode in a reaction container in a working example, and FIG. 2(b) is a graph showing changes in tritium concentration in samples collected from a dilute hydrochloric acid solution applying the membrane electrode in the reaction container in a comparative example.

FIG. 3(a) is a graph showing changes in the tritium concentration in samples collected from tritium-containing water in a reaction container in a comparative example, and FIG. 3(b) shows changes in the tritium concentration in samples collected from a dilute hydrochloric acid solution using the membrane electrode in the reaction container in a comparative example.

FIG. 4(a) illustrates a reaction system including a membrane electrode for absorbing tritium according to one embodiment, and FIG. 4(b) illustrates a unit of a membrane electrode for absorbing tritium according to one embodiment.

FIG. 5(a) is a graph showing changes in the tritium concentration in samples collected from tritium-containing water using the unit of the membrane electrode in a working example, and FIG. 5(b) shows a peak indicating the existence of tritiated gas such as HTO and HT detected in the head space air of the reaction container using the membrane electrode unit.

DESCRIPTION OF EMBODIMENTS

Figure 6A:
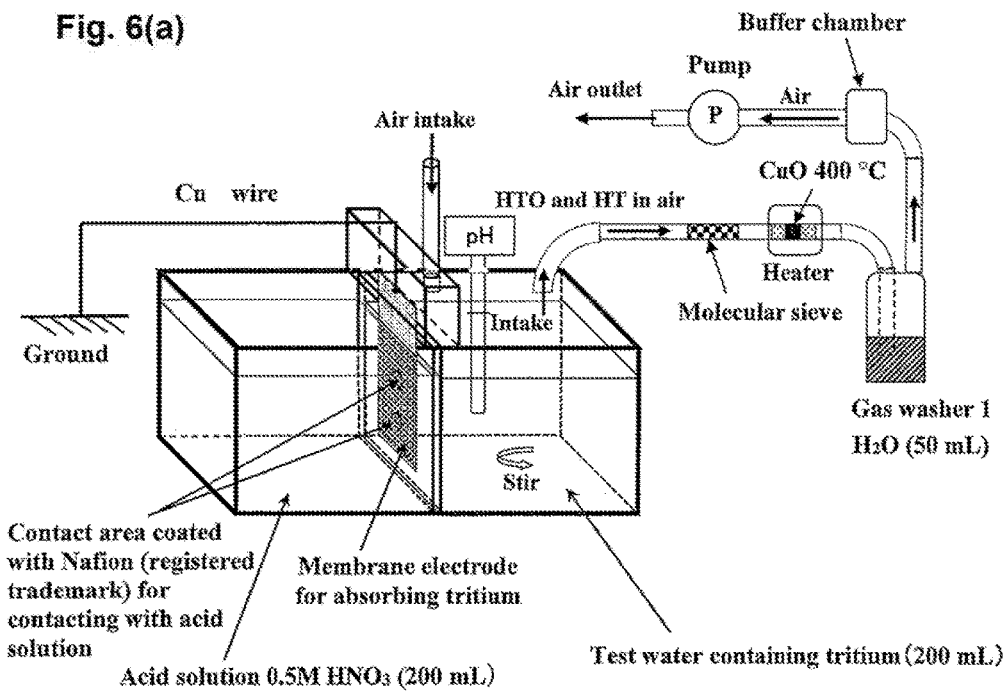
FIG. 6(a) illustrates a reaction system according to one embodiment for absorbing tritium from tritium-containing water using a membrane electrode and for recovering tritium into water placed in a gas-washing bottle by suction of tritium-containing air from the head space of the reaction container.

A tritium absorbing material according to one or more embodiments of the present invention, which is used for a membrane electrode for absorbing tritium, is formed from a hydrogen ion-containing manganese oxide having a spinel crystal structure (the theoretical composition ratio based on crystallography is $H_xMn_2O_4$ and $0 \leq x \leq 1$).

Hydrogen ion-containing spinel crystal structures have been reported, for example, in J. C. Hunter, "Preparation of a new crystal structure of manganese dioxide:lambda-$MnO_2$", Journal of Solid State Chemistry 39 (1981) 142-147, and a synthesis condition to optimize hydrogenation of a hydrogen ion-containing manganese oxide has been reported in H. Koyanaka, O. Matsubaya, Y. Koyanaka, and N. Hatta, "Quantitative correlation between Li absorption and H content in Manganese Oxide Spinel λ-$MnO_2$", Journal of Electroanalytical Chemistry 559 (2003) 77-81. For example, the synthesis of hydrogen ion-containing manganese oxide having a spinel crystal structure can be performed by the following methods.

The hydrogen ion-containing manganese oxide having a spinel crystal structure can be prepared through an acid treatment of a lithium ion-containing manganese oxide having a spinel crystal structure.

The lithium ion-containing manganese oxide having a spinel crystal structure can be prepared, for example, through the processes of mixing, firing, and purifying using a chemical including a carbonate of manganese, such as manganese carbonate, and a hydrate of manganese carbonate, or a hydroxide of lithium, as a raw material. The manganese oxide having a spinel crystal structure containing hydrogen ions can be obtained further through a process of an acid treatment in addition to the processes described above.

In the mixing process, for example, the raw material powder described above is mixed at room temperature. At this time, the mixing is performed until the mixture is blackened. This generates a crystal nucleus of the lithium ion-containing manganese oxide having a spinel crystal structure. In the firing process, the nucleus generated in the mixing process is grown. For example, the mixture is heated at a temperature of 200 to 1000° C., preferably 300 to 500° C., and more preferably 350 to 450° C. for 1 to 10 hours in the atmospheric air. In the purifying process, a fired material obtained in the firing process is suspended in weak alkalinity distilled water, and then the resultant suspension is left to stand for a certain period of time, and the precipitate is recovered. This precipitate is a lithium ion-containing manganese oxide having a spinel crystal structure. When the lithium ion-containing manganese oxide having a spinel crystal structure is to be stored, the precipitate recovered by a filtration treatment or the like is stored in sealed vacuum desiccators in a cool and dark place. Further, when a drying treatment of the lithium ion-containing manganese oxide having a spinel crystal structure is to be performed, the drying treatment can be performed at room temperature under a vacuum condition of about minus 600 hPa or around 50 to 150° C. in the atmospheric air. Next, when a hydrogen ion-containing manganese oxide is synthesized through the process of an acid treatment, the lithium ion-containing manganese oxide powder having a spinel crystal structure is suspended in an acid aqueous solution containing hydrogen (H), such as a hydrochloric acid (HCl) aqueous solution, and stirred for around several hours. Subsequently, the resultant suspension is separated into solid and liquid, and hydrogen ion-containing manganese oxide powder is obtained. The obtained hydrogen ion-containing manganese oxide powder having a spinel crystal structure is stored in a sealed container in a cool and dark place in a wet state. The powder should not be subjected to a heat drying treatment. The reason for this is that a heat drying treatment can proceed a reaction in which hydrogen ions in a crystal structure are transpired as a water molecule from the crystal to change the crystal structure of an absorbent to the crystal structure of lambda manganese dioxide containing no ion-exchangeable hydrogen ions, thus reducing the absorbability of the absorbent for tritium ions in water. This phenomenon has been reported in Hideki Koyanaka and Hideo Miyatake, "Extracting Tritium from Water Using a Protonic Manganese Oxide Spinel, Separation Science and Technology", 50, 14, 2142-2146, (2015).

The hydrogen ion-containing manganese oxide having a spinel crystal structure obtained through the above processes constitutes a tritium absorbent. A hydrogen ion-containing manganese oxide having a spinel crystal structure synthesized by a method other than the method described above can also constitute a tritium absorbent.

To enhance the absorption ability to tritium, the particle diameter of the primary particles in the hydrogen ion-containing manganese oxide having a spinel crystal structure is preferably in the range of 20 to 70 nm. To obtain the particle diameter within the range, the firing temperature is set in the range of 350 to 450° C. in the firing process described above.

The membrane electrode for absorbing tritium may be a membrane electrode construct containing the hydrogen ion-containing manganese oxide powder having a spinel crystal structure, a binder material, an electro-conductive support material, and a hydrogen ion conductive material. Such a membrane electrode construct may be formed as a porous membrane, and can also be formed by fixing a tritium absorbent powder onto the surface of an electro-conductive porous material using a conductive coating as a binder. Specifically, the membrane electrode for absorbing tritium according to one embodiment of the present invention contains an electro-conductive porous material, a lithium ion-containing manganese oxide powder having a spinel crystal structure, a conductive coating, and a hydrogen ion conductive film. The form of the lithium ion-containing manganese oxide in the membrane electrode can be changed to that of a hydrogen ion-containing manganese oxide by an acid treatment of the membrane electrode with a dilute acid solution such as hydrochloric acid or nitric acid in advance when the membrane electrode is brought into contact with tritium-containing water. In addition, the lithium-ion-containing manganese oxide powder having a spinel crystal structure can be fixed onto the surface of a wire-mesh made of the electro conductive materials such as platinum, stainless steel, or graphite by applying a conductive coating containing carbon filler or the like and drying the coating. Furthermore, a dispersion of hydrogen ion conductive material Nafion (registered trademark) or the like was applied on one side of the membrane electrode surfaces, and dried in the final process to complete the membrane electrode construct.

When the membrane electrode construct obtained by the method described above is brought into contact with tritium-containing water, the surface with hydrogen ion-containing manganese oxide and the opposite surface with hydrogen ion conductive material are brought into contact with tritium-containing water and a dilute acid aqueous solution, such as hydrochloric acid or nitric acid, respectively.

This arrangement of the membrane electrode and the solutions in the embodiment of the present invention enables continual supply of hydrogen ions to the hydrogen ion-containing manganese oxide having a spinel crystal structure contained in the membrane electrode construct from a dilute acid aqueous solution, and produces the effect of preventing the re-elution of tritium from the membrane electrode into water due to casting of the different chemical reactivity with tritiated water (HTO) or a dilute acid aqueous solution on each surface of the membrane electrode.

The membrane electrode for absorbing tritium according to the embodiment of the present invention uses a simple chemical separation at room temperature, which eliminates a complicated reaction system, and addition of energy such as heat or electricity, and is thus inexpensive, as compared with conventional separation techniques of tritium utilizing the slight difference in the physical properties such as the boiling point or mass between light water ($H_2O$) and isotopomers of water (HTO, DTO, $T_2O$). The technique according to the embodiment of the present invention enables an inexpensive and simple separation and recovery of tritium from water through the separation and recovery of tritium at a low concentration of about $10^6$ Bq/L (corresponding to several-nano grams per liter in mass concentration) in water, which is very difficult with conventional technologies.

The absorption mechanism of tritium by the tritium absorbent of the present embodiment is considered to be based on the absorption reaction of the tritium ions ($T^+$) to the absorbent of the present embodiment and the absorption of tritium ions ($T^+$) generated from an oxidation reaction ($OT^- \rightarrow T^+ + 2e^- + \frac{1}{2} O_2$) of the hydroxide ion-containing tritium ($OT^-$), which generates on a surface of the absorbent of the present embodiment containing manganese oxide with a strong oxidizing ability as its main component. In general, the degree of self-dissociation of water molecules is significantly low; therefore, tritium in light water ($H_2O$) is present mostly as an isotopomer of water molecules (HTO) but not as ions ($T^+$ or $OT^-$). The absorbent of the present embodiment is considered to decompose $OT^-$ to $T^+$, oxygen, and electrons at the surface of the absorbent, and absorbs the $T^+$ into the crystal of the absorbent; further, the tritium is collected by bonding with oxygen ions that constitute the crystal. A decrease in the tritium concentration based on such oxidation reaction of $OT^-$ in the water promotes a self-dissociation of isotopomers of tritiated-water molecules (HTO, DTO, $T_2O$) in the water (for example, HTO→$H^+$+$OT^-$, DTO→$D^+$+$OT^-$, and $T_2O$ $T^+$+$OT^-$). In this reaction, $T^+$ may be converted to $OT^-$ through the formation of HTO. These results suggest that the absorbent of the present embodiment produces the effect of absorbing and separating all the chemical species containing the tritium ($OT^-$, $T^+$, HTO, DTO, and $T_2O$) present in water.

The chemical formulas for the absorbent of the present embodiment absorbing tritium are given below. According to the chemical formula (1), a hydrogen ion-containing manganese oxide ($H^+$, $e^-$)$_x$Mn$_2$O$_4$ having a spinel crystal structure can be obtained by an acid treatment of a lithium ion-containing manganese oxide, Li$_x$Mn$_2$O$_4$ having a spinel crystal structure. In the chemical formula (1), a hydrogen atom (H) is denoted as ($H^+$, $e^-$) using $H^+$ and $e^-$ because a hydrogen ion ($H^+$) in a crystal structure of a manganese oxide having a spinel crystal structure forms a weak covalent bond (can also be said to be a strong hydrogen bond) with oxygen ions in the crystal and shows the property of hydrogen ions that easily move in the crystal. This property is specific to a nanometer-scale particle of hydrogen ion-containing manganese oxide having a spinel crystal structure obtained by an acid treatment of a lithium ion-containing manganese oxide having a spinel crystal structure synthesized at a relatively low temperature of 390° C., as described in H. Koyanaka, Y. Ueda, K. Takeuchi, and A. I. Kolesnikov, "Effect of crystal structure of manganese dioxide on response for electrolyte of a hydrogen sensor operative at room temperature", Sensors & Actuators: B, Vol. 183, pp. 641-647, (2013).

In addition, the oxidation state in almost all manganese ions in a hydrogen ion-containing manganese oxide ($H^+$, $e^-$)$_x$Mn$_2$O$_4$ has been experimentally determined to be +4 using X-ray absorption near edge spectroscopy. For the state before an acid treatment, the oxidation state in manganese ions in a lithium ion-containing manganese oxide Li$_x$Mn$_2$O$_4$ has been determined to be +3.5, indicating an equivalent mixture of +3 and +4. Such different oxidation states of manganese ion between the hydrogen ion-containing manganese oxide and the lithium ion-containing manganese oxide may result from the following phenomenon: the lithium ions (Li$^+$) form a covalent bonding with oxygen ions for sharing of electrons in a spinel crystal structure of manganese oxide, whereas the electrons (e) in the ($H^+$, $e^-$)$_x$Mn$_2$O$_4$ do not influence the electron-orbital (d-orbital) in manganese that results in maintaining +4 in the oxidation state of Mn. The electrons ($e^-$) thus easily move in the crystal, like the hydrogen ions. This finding is supported by a higher conduction ability of hydrogen ion ($H^+$) in a manganese oxide having a spinel crystal structure than other crystal structures of manganese oxide reported in, for example, Y. Ueda, Y. Tokuda, T. Yoko, K. Takeuchi, A. I. Kolesnikov, and H. Koyanaka, "Electrochemical property of proton-conductive manganese dioxide for sensing hydrogen gas concentration", Solid State Ionics, 225, 4, pp. 282-285, (2012).

The absorbent ($H^+$, $e^-$)$_x$Mn$_2$O$_4$ obtained from the reaction shown in chemical formula (1) can separate and absorb $T^+$ from water through an ion exchange reaction of $H^+$ with $T^+$ accompanied by an oxidative decomposition of $OT^-$ described in chemical formula (2). Furthermore, the absorbent can allow such selective absorption and separation of tritium present at a low concentration in light water ($H_2O$) for the reasons considered as follows. In the reaction of chemical formula (2), the stability of tritium ions ($T^+$) stored in the crystal with a weak covalent bond is higher than that of hydrogen ions ($H^+$) due to their three times larger mass than hydrogen ions ($H^+$). This stability of tritium ions ($T^+$) provides a higher probability in collecting tritium ions into the crystal compared with hydrogen ions ($H^+$); such stability allows the increased reactivity of tritium ions ($T^+$) in the crystal. In addition, the rate of self-dissociation of an isotopomer of tritiated water (HTO) may be higher than that of light water ($H_2O$). This is considered to be an additional reason for the absorbent allowing such selective absorption and separation of tritium present at a low concentration in light-water ($H_2O$).

[Chem. 1]

$$Li_xMn_2O_4 + xH^+ \rightarrow (H^+, e^-)_xMn_2O_4 + xLi^+ \quad (1)$$

$$(H^+, e^-)_xMn_2O_4 + yOT^- \rightarrow (H^+, e^-)_{x-y}(T^+, e^-)_yMn_2O_4 + y(2e^-) + yH^+ + y(\tfrac{1}{2}O_2) \quad (2)$$

$$(H^+, e^-)_x(T^+, e^-)_yMn_2O_4 + y(2e^-) + yH^+ \rightarrow (H^+, e^-)_{x-y}(\square, e^-)_yMn_2O_4 + yHT \quad (3)$$

$$(H^+, e^-)_xMn_2O_4 + yOT^- \rightarrow (H^-, e^-)_{x-y}(\square, e^-)_yMn_2O_4 + yHTO \quad (4)$$

The above chemical formula (3) shows a reaction for producing a tritiated hydrogen gas (HT) from the membrane electrode that has absorbed tritium. In the chemical formulas (1)-(4), x represents the molar ratio of hydrogen ions or lithium ions to other elements contained in the absorbent, and y represents the molar ratios of tritium absorbed into the absorbent to other elements, tritiated hydrogen gas (HT), and tritiated water isotopomer (HTO). The chemical formula (4) shows as an appearance reaction representing the overall reaction of the chemical formulas (2) and (3). The reactions in the chemical formulas (2)-(4) indicate that a manganese oxide catalyst produces a selectively oxidative decomposition of a tritiated hydroxide ions (OT) in water, and such a manganese oxide catalyst can separate tritium from a liquid phase to a vapor phase in a gaseous form of tritiated water isotopomer (HTO). The symbol $\square$ on the right side of the chemical formulas (3) and (4) represents a site that can become an empty absorption site when a tritium ion is released from a crystal of absorbent in the membrane electrode that has collected tritium. The existence of the site has been reported as an oxygen-tetrahedron containing oxygen-pairs having an inter-atomic distance (2.585 Å) in a manganese oxide having a spinel crystal structure in H. Koyanaka, Y. Ueda, K. Takeuchi, and A. I. Kolesnikov, "Effect of crystal structure of manganese dioxide on response for electrolyte of a hydrogen sensor operative at room temperature", Sensors & Actuators: B, Vol. 183, pp. 641-647, (2013).

In a system using the membrane electrode in the present embodiment, hydrogen ions ($H^+$) are supplied from an acid aqueous solution to such sites enabling ion exchange reactions through a hydrogen ion conductive film. This supply of hydrogen ions to the sites provides the function of absorbing tritium due to maintaining of the state of $(H^+, e^-)_x Mn_2 O_4$ on the left side of the chemical formula (2). In the chemical formula (2), a tritiated hydroxide ion ($OT^-$) is on the left side, and a hydrogen ion ($H^+$) on the right side, suggesting that the ion exchange reaction of the chemical formula (2) can progress well under a pH condition from weak alkalinity to alkalinity, compared with the pH condition under weak acidity to acidity. Thus, a tritium containing-water having the pH condition from weak acidity to alkalinity (e.g., pH of 6 or more and less than 9) is preferably brought into contact with the membrane electrode for absorbing tritium according to the embodiment of the present invention. A hydrogen ion ($H^+$) is on the left side of the chemical formula (3); therefore, it is considered that the reaction to recovery of tritium from the membrane electrode for absorbing tritium according to the embodiment of the present invention that has absorbed tritium proceeds well preferably under an acidic condition (e.g., pH of for more and less than 4).

In the embodiment of the present invention, the distributions of concentrations of tritium ions ($T^+$) and hydrogen ions ($H^+$) within the membrane electrode for absorbing tritium can facilitate progress of tritium absorption using a membrane electrode with one surface coated with a hydrogen ion conductive film of, for example, Nafion (registered trademark). More specifically, the tritium absorption in the chemical formula (2) having a hydrogen ion on the right side does not easily progress on a surface coated with Nafion (registered trademark), which contacts a strong acidic (e.g., pH of 0.1 or more and less than 1) aqueous solution due to the high concentration of hydrogen ions. In addition, the oxygen evolution described on the right side in the chemical formula (2) is obstructed on a surface coated with Nafion (registered trademark), which contacts a strong acidic aqueous solution. The tritium absorption described in the chemical formula (2) therefore does not easily progress on the surface that contacts a dilute acidic aqueous solution, and the tritium transferred from tritium-containing water to the acidic aqueous solution is very difficult to collect with the membrane electrode again. Accordingly, the tritium concentration on the membrane electrode surface neighborhood that contacts tritium-containing water is expected to be higher than that on the surface coated with Nafion (registered trademark) that contacts a dilute acid aqueous solution. By contrast, the hydrogen ion concentration on the surface neighborhood coated with Nafion (registered trademark) that contacts a dilute acid aqueous solution becomes high due to hydrogen ions ($H^+$) supplied continually through the Nafion (registered trademark) film. Such a difference in the reactivity on the each surface of the membrane electrode as mentioned above causes different distributions of the concentrations of $T^+$ and $H^+$ within the membrane electrode.

In general, the ionic conductions in materials occur from a higher concentration side to a lower side; therefore, the transfer of $T^+$ within the membrane electrode in the present embodiment for absorbing tritium is promoted from the surface side that contacts tritium-containing water toward the surface side that contacts a dilute acidic aqueous solution. By contrast, the transfer of hydrogen ions is promoted from the surface coated with Nafion (registered trademark) that contacts a dilute acidic aqueous solution toward the surface that contacts tritium-containing water. This suggests that the properties of the membrane electrode for absorbing tritium according to the embodiment of the present invention described above enable the continual absorption of tritium and the decrease of tritium concentration in tritium-containing water.

The right side of the chemical formula (4), which integrates the chemical formulas (2) and (3), has a tritiated water isotopomer molecule (HTO) as a final product. This suggests that the tritiated water isotopomer molecules (HTO) transpire into air from a membrane electrode having an interface of three-phases of solid-liquid-gas and permeate in the head space of a sealed reaction container including a membrane electrode and tritium-containing water. In contrast with the present membrane electrode, when a manganese oxide having a spinel crystal structure was applied to a suspension of an absorbent with tritium-containing water, which is described in the WO2015/037734, an elution of tritium into a suspension from the absorbent that has absorbed tritium, caused by an insufficient hydrogen ions in the crystal structure, was observed, and the recovery of tritium from a reaction system to the outside was impossible. In the embodiment of the present invention, a portion of the membrane electrode is exposed in air to constitute an interface of three-phases of solid-liquid-gas in the head space of a sealed reaction container. Thus, the method according to the embodiment of the present invention can transpire tritiated gas (HTO or HT) into air in the head space in a sealed reaction container. The method according to the embodiment of the present invention can thus recover the transpired HTO or HT gas from the sealed reaction container into a capture material having a high absorbing capacity of water or hydrogen gas, for example, a small amount of light water ($H_2O$) or porous materials using, for example, a pump.

The method for separating and recovering tritium from water using the membrane electrode for absorbing tritium according to the embodiment of the present invention will be described in detail.

First, the membrane electrode is brought into contact with tritium-containing water. Tritium is then separated from tritium-containing water through collecting tritium into the membrane electrode by adjusting the pH of the tritium-containing water into the range from weak acidity to alkalinity. This procedure can decrease the concentration of tritium in the tritium-containing water.

The membrane electrode for absorbing tritium according to the embodiment of the present invention is designed to have its reaction surfaces to be contacted with tritium-containing water to absorb tritium and to be contacted with a dilute acidic aqueous solution to supply hydrogen ions ($H^+$) into the membrane electrode through a hydrogen ion conductive film, such as Nafion (registered trademark). However, the reaction surfaces of membrane electrodes described in WO2015/037734 are not coated with a hydrogen-ion conductive film, and thus an absorbent of a manganese oxide is exposed on both the reaction surfaces in the membrane electrodes, which partition a tank for tritium-containing water and a tank for a dilute acidic aqueous solution in a reaction container. Such a membrane electrode causes an oxidative decomposition of hydroxide ions on both its reaction surfaces with a manganese oxide, and produces oxygen gas covering both the reaction surfaces. Thus, the membrane electrode can be difficult to have a difference in the concentrations of $T^+$ and $H^+$ between both the reaction surfaces.

In contrast with the membrane electrode described in WO2015/037734, the membrane electrode according to the embodiment of the present invention having one side of its surface coated with a hydrogen ion conductive film such as Nafion (registered trademark) can prevent an elution of tritium to water from the membrane electrode that has absorbed tritium, and thus can allow continual absorbing of tritium from water.

In the present embodiment, tritium can have a high absorption ability when the membrane electrode is placed into contact with tritium-containing water having a pH from weak acidity to alkalinity. The absorption of tritium is difficult in tritium-containing water having a pH of strong acidity such as pH 3 or less due to the reason described above. Further, dissolution of manganese from an absorbent in the membrane electrode is produced in tritium-containing water having a pH of strong alkalinity of pH10 or more. In the present embodiment, the pH of tritium-containing water is preferably adjusted to, for example, a pH range of 5 or more and 9 or less, to absorb tritium from water into the membrane electrode.

Hydrogen ions ($H^+$) may be supplied to the membrane electrode according to the embodiment of the present invention any of various methods. One simple method to supply $H^+$ includes bringing the membrane into contact with acid. For example, dilute acid aqueous solutions having a pH of 0.3 or more to substantially 1 may be preferably used. Specifically, $H^+$ are supplied into the reaction surface of the membrane electrode through a hydrogen ion conductive film by contacting the electrode in, for example, a dilute hydrochloric acid aqueous solution for enabling continual absorption of tritium using the membrane electrode.

For example, hydrochloric acid or nitric acid may be used as acid aqueous solutions.

Furthermore, in the present embodiment, tritium collected into a solid phase of a membrane electrode can be converted to tritiated water isotopomer (HTO) gas or tritiated hydrogen (HT) gas by bringing the membrane electrode that has absorbed tritium in contact with water under a weakly acidic or acidic condition. In addition, to recover tritium from the membrane electrode, it is preferable to adjust the pH of tritium-containing water to, for example, 0.3 or more and 4 or less. It is more preferable to adjust the pH to 1 or more and 3 or less. This enables an enrichment and recovery of the HTO or HT gas transpired into air in a sealed reaction container, which contains the membrane electrode, tritium-containing water, and a dilute acid aqueous solution, into various solvents are placed by suction of air using a vacuum pump or the like.

Various materials may be used as the above solvents having a high ability in the water ($H_2O$) absorption and hydrogen ($H_2$) dissolution, such as light-water ($H_2O$) and various porous materials.

In addition, in the present embodiment, the tritium-containing water that has been brought into contact with the membrane electrode for absorbing tritium may be circulated to be into contact with the membrane electrode again. Here, the concentration of radioactivity derived from tritium in the tritium-containing water is constantly measured using a flow type liquid scintillation counter, the tritium-containing water is discharged at the time point at which its radioactive concentration is decreased to the reference value (for example, the concentration permitted to be discharged to public water areas on the basis of the laws and regulations), the tritium-containing water is continuously circulated. When the radioactive concentration does not reach the reference value, the tritium-containing water is repeatedly brought into contact with the membrane electrode until the radioactive concentration reaches a value equal to or less than the reference value. This allows inexpensive and highly efficient separation and removal of tritium in water.

In handling the membrane electrode after adsorption of tritium, tritium is to be prevented from being transpired into the atmospheric air as tritiated water (HTO) or hydrogen (HT). For safety, the tritium recovery facility using the adsorbent has dehumidifying equipment and a system installed to dehumidify and recover a water isotope containing tritium transpired in the atmospheric air inside the recovery facility.

The present invention will be described in more detail with reference to Examples, but the present invention is not limited to these Examples.

EXAMPLES

Example 1

Synthesis of Tritium Absorbent

With the following procedure, a lithium ion-containing manganese oxide having a spinel crystal structure and a tritium adsorbent containing hydrogen ion-containing manganese oxide having a spinel crystal structure were synthesized.

Raw Material and Mixing

Powders of reagent manganese carbonate hydrate ($MnCO_3.nH_2O$) and reagent lithium hydroxide hydrate ($LiOH.H_2O$) manufactured by WAKO PURE CHEMICAL IND., LTD. are mixed together at the weight ratio of 2 to 1 and thoroughly mixed at room temperature until the powder mixture is blackened.

Calcination

The powder mixture is heated at 390° C. for 6 hours using an electric furnace (FO-410 manufactured by YAMATO CO.) in the atmospheric air and then cooled to room temperature.

Purification

The powder (e.g., 20 g) after natural cooling is suspended in an appropriate amount of ion exchanged pure water (1 L) in a container such as a beaker, and the aggregate of the powder is disentangled using an ultrasonic wave for 10 minutes through the wall of the container, such as a beaker. Unreacted manganese carbonate remains as turbidity in the supernatant of the ion exchanged pure water because manganese carbonate has a low specific gravity, and lithium ion-containing manganese oxide having a spinel crystal structure and a heavy specific gravity deposits on the bottom of the container. After the suspension is left to stand still for 30 minutes, manganese carbonate in the supernatant is removed using an aspirator or the like, and the precipitated lithium ion-containing manganese oxide powder having a spinel crystal structure is recovered. At this time, the pH of the ion exchange purified water in which the powder is suspended is maintained to be weakly alkalinity to alkalinity. This series of purification treatment of lithium ion-containing manganese oxide removes manganese carbonate remaining as an unreacted substance in the calcination process.

Storage

The lithium ion-containing manganese oxide powder having a spinel crystal structure that is recovered through the filtration treatment or the like is stored in a cool and dark place. When the drying treatment is to be performed, the powder is subjected to the drying treatment at around 50 to 120° C. for several hours in the atmospheric air, or the drying treatment at room temperature for several hours under vacuum condition around minus 600 hPa in a vacuum desiccator. In this example, the lithium ion-containing manganese oxide was dried at 100° C. in the atmospheric air for 6 hours. The chemical compositions of lithium ion-containing manganese oxide and hydrogen ion-containing manganese oxide were reported to be $Li_{1.15}Mn_2O_{4.6}$ and $H_{1.35}Mn_2O_{4.1}$, respectively, in H. Koyanaka, O. Matsubaya, Y. Koyanaka, and N. Hatta, "Quantitative correlation between Li absorption and H content in Manganese Oxide Spinel λ-$MnO_2$", Journal of Electroanalytical Chemistry 559 (2003) 77-81.

By the operation described above, a lithium ion-containing manganese oxide and a tritium adsorbent containing hydrogen ion-containing manganese oxide were obtained in the form of particles having a primary particle size of 20 nm to 70 nm with a spinel crystal structure.

Preparation of Membrane Electrode for Absorbing Tritium

The lithium ion-containing manganese oxide powder ($Li_{1.15}Mn_2O_{4.6}$) in an amount of 0.27 g obtained by the synthesis method described above was fixed on a surface (4.0×2.0×0.16 cm) of a platinum-wire mesh (100 meshes, 5.0×2.0×0.16 cm) at a film thickness of 0.3 mm using a conductive coating material (DOTITE XC-12 manufactured by FUJIKURA KASEI CO., LTD.) as a binder, and the resultant fixed powder was subjected to heat drying at 150° C. for 3 hours in the atmospheric air using a dryer (WFO-401 manufactured by TOKYO RIKAKIKAI CO., LTD.), resulting in an electrode film in a porous state obtained at the same time as the binder was carbonized. Next, a dispersion of Nafion (registered trademark) at a concentration of 20% (WAKO PURE CHEMICAL IND., LTD.) was uniformly applied on one side (4.0 cm×2.0 cm) of the membrane electrode, and dried at 60° C. for 2 hours in the atmospheric air. Finally, the resultant Nafion (registered trademark) was applied on one side of the membrane electrode as a hydrogen-ion conductive film with heating at 120° C. for one hour in the atmospheric air.

Tritium Absorption Experiment

In the preparation of tritium-containing water, 40 μL of a standard reagent of tritium (water [$^3$H] 5 mCi, 5 g, 1.0 mCi/g Apr. 25, 1985 manufactured by Dupont) was diluted with 150 mL of distilled water (WAKO PURE CHEMICAL IND., LTD.) at room temperature (21.0° C.), tritium-containing water for an experiment having a radioactive concentration of 2409 Bq/mL was prepared in a glass beaker. Thus, the radioactivity of the tritium-containing water (150 mL) was estimated to be 2409000 Bq. A liquid scintillation counter (Liquid Scintillation Analyzer TRI-CARB 2100TR manufactured by PACKARD, USA) was used to measure the radioactive concentration of tritium. Each 10.0 mL portion of a surfactant containing a fluorescent agent that emits light with β rays (ULtima Gold manufactured by PERKIN ELMER, INC.) was added as a scintillator to each 1.0 mL sample of the tritium-containing water used for the experiment. The tritium concentration in the distilled water (1.0 mL) used for the experiment was measured as a blank sample by the method. As a result, 1.1 Bq/mL was detected. The results show that the detection lower limit of the radioactive concentration of tritium in the present analyzer and under the present conditions was 1.1 Bq/mL. A 0.1M or 0.5M concentration of sodium hydroxide solution was used for the pH control of the tritium-containing water. A pH meter (F-55, glass electrode type 6378-10D manufactured by HORIBA CO.) and a pH test paper were used for monitoring the pH and the temperature of the tritium-containing water.

Experiment for absorbing tritium from tritium-containing water using membrane electrode including hydrogen ion-containing manganese oxide and Nafion (registered trademark) film—No. 1

The experimental setup was shown in FIG. 1(a). In the reaction system, the reaction container contains a transparent acrylic resin, and the reaction container is partitioned into two tanks by a membrane electrode that contains lithium ion-containing manganese oxide absorbent (the membrane electrode has a surface area of 12.6 $mm^2$ to contact with tritium-containing water and a dilute hydrochloric acid solution). To prevent water leaks, gaps in the acrylic tank were sealed with a silicone adhesive (Basukoku, manufactured by CEMEDINE CO., LTD.) and dried for 2 days. In the present experiment, the membrane electrode was electrically grounded through a copper wire during the experiment. FIG. 1(b) shows a membrane electrode according to the embodiment of the present invention containing hydrogen ion-containing manganese oxide absorbent powder fixed on a platinum-wire mesh using a conductive coating. Furthermore, a typical hydrogen ion conductive material Nafion (registered trademark) was coated on one side of the membrane electrode with the procedure described above.

Next, an acid treatment of the membrane electrode was conducted by filling a 0.5 M dilute hydrochloric acid solution (200 mL) into each tank in the reaction container. It was then left to stand for 1 hour. By this acid treatment, lithium ion-containing manganese oxide in the membrane electrode changes its form to that of hydrogen ion-containing manganese oxide through elution of lithium ions from the lithium ion-containing manganese oxide. The dilute hydrochloric acid solution was then removed from each tank, and the inside surface of each tank was rinsed with distilled water to remove the contamination with a dilute hydrochloric acid solution. Herein, the hydrogen ion-containing manganese oxide having a spinel crystal structure should not be dried in the atmospheric air. This is because the ion exchangeable $H^+$ contained in the hydrogen ion-containing manganese oxide absorbent evaporates as water and is lost from the absorbent, resulting in deterioration of the tritium absorption capacity, as reported in Hideki Koyanaka and Hideo Miyatake, "Extracting tritium from water using a protonic manganese oxide spinel", Separation Science and Technology, 50, 14, 2142-2146, (2015).

For the experiment for absorbing tritium, a sample (1.2 mL) from tritium-containing water prepared in a glass beaker was collected to measure the initial concentration of tritium. The tritium-containing water (150 mL) was introduced into the left tank in the reaction container as shown in FIG. 1(a), and a 0.5 M concentration hydrochloric acid aqueous solution (150 mL) (WAKO PURE CHEMICAL IND., LTD) was introduced into the right tank. In that case, the reaction surface coated with Nafion (registered trademark) was placed toward the dilute hydrochloric acid aqueous solution, and the reaction surface exposed to hydrogen-ion-containing manganese oxide having a spinel crystal structure was placed toward the tritium-containing water.

Next, the initial pH of the tritium-containing water for the experiment was adjusted to 9.5 by adding a 0.1 M or 0.5 M aqueous solution of reagent sodium hydroxide, and thereafter the tritium-containing water was continuously stirred using a magnetic stirrer and a stirring bar coated with Teflon (registered trademark) resin while adjusting the pH to converge to from 6.8 to 9.5 by adding the aqueous solution of reagent sodium hydroxide to it in an appropriate amount and at an appropriate time. Each sample (1.2 mL) of the tritium-containing water for the experiment and the 0.5 M dilute hydrochloric acid aqueous solution was collected by filtration using a disposable filter (DISMIC-25AS manufactured by ADVANTEC) and a disposable syringe (SS-02SZP manufactured by TERMO) every after a predetermined time. Finally, a 1.0 mL portion of each sample was separated from a 1.2 mL portion of each sample using a precise micropipette, and the changes in the radioactive concentration were measured using a liquid scintillation counter.

The results obtained from the above experiment are illustrated in FIGS. 2(a) and 2(b). The vertical axis in FIGS. 2(a) and 2(b) indicates the radioactive concentration of tritium, and the horizontal axis indicates the reaction time. FIG. 2(a) illustrates changes in the tritium radioactive concentration in tritium-containing water, and FIG. 2(b) illustrates changes in the tritium radioactive concentration in a 0.5 M dilute hydrochloric acid aqueous solution. In FIG. 2(a), it can be seen that the tritium radioactive concentration in the tritium-containing water decreased by 101 Bq/mL from 2409 Bq/mL of the initial concentration to 2308 Bq/mL when 30 minutes elapsed. In the experiment, 150 mL of tritium-containing water was used, and thus it was found that 10156 Bq of tritium was separated from the tritium-containing water after 30 minutes by the membrane electrode containing 0.27 g of absorbent. Further, it can be seen that the tritium radioactive concentration in the tritium-containing water decreased by 210 Bq/mL from 2409 Bq/mL of the initial concentration to 2199 Bq/mL when 720 minutes elapsed. Accordingly, it was found that 31500 Bq of tritium was separated from the tritium-containing water by the membrane electrode tested in the present experiment. Furthermore, a marked continual decrease in the tritium radioactive concentration over 720 minutes was observed in FIG. 2(a) though a temporary increase in the tritium radioactive concentration existed between the reaction time of about 50 minutes and the reaction time of about 100 minutes. No such continual decrease in the tritium radioactive concentration was observed in the experimental result described in WO2015/037734. This specific result is provided using the membrane electrode according to the embodiment of the present invention. In addition, a little leaching of manganese of about 0.1 mg/L or less in the tritium-containing water after the experiment was measured using ICP emission spectroscopy. The result in FIG. 2(b) shows that the tritium transferred and eluted into 150 mL of dilute hydrochloric acid aqueous solution was estimated to be 1800 Bq from the increased tritium radioactive concentration in the hydrochloric acid aqueous solution to 12 Bq/mL at the reaction time of 720 minutes.

Comparative Example

Experiment for absorbing tritium from tritium-containing water using membrane electrode including hydrogen ion-containing manganese oxide and Nafion (registered trademark) film—No. 2

In the experiment described in Example 1, the tank on the right side illustrated in FIG. 1(a) was filled with a 0.5 M dilute hydrochloric acid (150 mL). In contrast with Example 1, 150 mL of distilled water (WAKO PURE CHEMICAL IND., LTD) was introduced into the tank, instead of the 0.5 M dilute hydrochloric acid in this Comparative Example. Then, an experiment similar to that of Example 1 for absorbing tritium was conducted under equal other conditions.

The experimental results obtained from the Comparative Example are illustrated in FIGS. 3(a) and 3(b). The vertical axis in these figures indicates the radioactive concentration of tritium, and the horizontal axis indicates the reaction time. FIG. 3(a) illustrates changes in the tritium radioactive concentration in tritium-containing water (150 mL), and FIG. 3(b) illustrates changes in the tritium radioactive concentration in distilled water (150 mL). The results shown in FIG. 3(a) indicate that 19913 Bq of tritium was separated from the tritium-containing water after 30 minutes by the membrane electrode containing 0.24 g of absorbent. However, clear differences are found in the results illustrated in FIGS. 2(a) and 3(a). That is, FIG. 3(a) shows that the tritium concentration at 300 minutes of the reaction time re-increased to the almost initial concentration by a significant elution of tritium. The reason for this is that distilled water does not have an enough $H^+$ concentration to supply $H^+$ to the membrane electrode through a Nafion (registered trademark) film. The results shown in FIG. 3(b) indicate little changes in the tritium radioactive concentration in the distilled water in the tank. This indicates that the transfer of tritium to distilled water from tritium-containing water is not mostly caused.

Therefore, the results prove that the method for supplying $H^+$ to the reaction surface coated with a Nafion (registered trademark) film on a membrane electrode from contacted dilute acid solution containing $H^+$ in a high concentration under the experimental conditions in Example 1 is highly effective, causing a continual decrease in the tritium concentration and preventing tritium elution as shown in FIG. 2(a).

Example 2

Experiment for absorbing tritium from tritium-containing water using membrane electrode including hydrogen ion-containing manganese oxide and Nafion (registered trademark) film—No. 3

In this Example, a reaction system as illustrated in FIG. 4(a) was used. The reaction container is a unit including the membrane electrode for absorbing tritium illustrated in FIG. 4(b) which contacted with tritium-containing water (140 mL) placed in a container made of transparent acrylic resin. For fabricating the unit, a container made of acrylic resin adhered onto the membrane electrode was placed for supplying hydrogen ions ($H^+$) to the Nafion (registered trademark) film coated surface on the membrane electrode from a small amount of dilute acid aqueous solution. The unit includes the acrylic container, an acrylic plate, and silicon rubber seats to prevent water leak, has two small holes with a diameter of 4 mm with a total contact area of 25.2 $mm^2$ on the reaction surface to contact with a tritium-containing-water and a dilute acidic aqueous solution. In addition, the membrane electrode in the unit was electrically grounded through a copper wire. As the effect of the ground, the dissolution of manganese is not observed when using the membrane electrode for several days, unlike the electrode not grounded.

For practical applications of this technology, minimizing the amount of effluent after treating a large amount of tritium-containing water using a small amount of dilute acid aqueous solution is economically preferable. In this Example, 7.0 mL of 0.5 M dilute nitric acid for supplying $H^+$ to the membrane electrode was used for absorbing and separating tritium from 150 mL of tritium-containing water.

The similar methods described in Example 1 were used in this Example for preparing a hydrogen ion-containing manganese oxide having a spinel crystal structure and for fabricating a membrane electrode for absorbing tritium. In this Example 2, however, a stainless steel-wire mesh (SUS304, 100 meshes) was used instead of a platinum-wire mesh used in Example 1. Stainless steel is an inexpensive material unlike platinum. Thus, if providing similar performance in tritium absorption and separation, the use of stainless steel-wire mesh provides economically high yield in the practical usage. The size of the membrane electrode fabricated in Example 2 had the same size as that in Example 1 using a platinum-wire mesh, and 0.24 g of lithium ion-containing manganese oxide was coated on the stainless steel-wire mesh using a conductive coating as a binder, and a Nafion (registered trademark) film was coated on one of the reaction surfaces of the membrane electrode with a method similar to the method described in Example 1. To prepare tritium-containing water having a radioactive concentration of 3105 Bq/mL, 14 µL of a tritium standard reagent (PERKIN ELMER, $^3$H, water) was diluted using 140 mL of distilled water (WAKO PURE CHEMICAL IND.) at room temperature. Thus, the radioactivity of the tritium-containing water (140 mL) was estimated to be 434700 Bq.

Next, the methods for absorbing and separating of tritium from tritium-containing water using the unit according to the embodiment of the present invention will be explained in detail below. At the beginning of the experiment, 7.0 mL of 0.5 M dilute nitric acid was introduced into an acrylic container through a small hole in the top surface of the container in the unit shown in FIG. 4(b), and then the unit was immersed in 140 mL of 0.5 M dilute nitric acid solution filled in a cubic container for 1 hour as shown in FIG. 4(a). By this acid treatment of the unit, lithium ion-containing manganese oxide in the membrane electrode changes its form to that of hydrogen ion-containing manganese oxide through elution of the lithium ions from the lithium ion-containing manganese oxide. Then, the dilute nitrogen acid solutions were removed from the cubic container and the acrylic container unit, and additionally the inside surfaces of the cubic container and the acrylic container unit were rinsed with distilled water to remove the contamination with a dilute nitric acid solution. After those operations above, 7.0 mL of 0.5 M nitric acid solution was introduce again into the acrylic container unit, and this acrylic container unit was immersed in 140 mL of tritium-containing water having a radioactive concentration of 3105 Bq/mL placed in the cubic container. Further, the membrane electrode was electrically grounded through a copper wire during the experiment. Next, the initial pH of the tritium-containing water for the experiment was adjusted to 9.5 by adding a 0.5 M aqueous solution of reagent sodium hydroxide, and thereafter the tritium-containing water was continuously and moderately stirred using a magnetic stirrer and a stirring bar coated with Teflon (registered trademark) resin. With the methods and the same equipment as in Example 1, each sample (1.2 mL) of the tritium-containing water for the experiment was collected at fixed intervals. Finally, a 1.0 mL portion of each sample was separated from a 1.2 mL portion of each sample, and the changes in the radioactive concentration of tritium were measured using a liquid scintillation counter.

FIG. 5(a) illustrates the results of the experiment. The results indicate the changes in the tritium radioactive concentration in tritium-containing water for the experiment. A continual decrease in the tritium radioactive concentration in the tritium-containing water was observed. Due to a moderate decrease in the pH of the tritium-containing water, the pH was adjusted to maintain in the range of 3.0 to 9.5 by adding a 0.1 M or 0.5 M sodium hydroxide solution in an appropriate amount and at an appropriate time. To prevent a static water pressure from being applied onto the surface of the membrane electrode, the same head level of solutions was maintained between the tritium containing water and the nitric acid solution in the acrylic container unit and the cubic container by a minute adjustment of the position of the acrylic container unit in the cubic container.

The tritium radioactive concentration in the tritium-containing water decreased from 3105 Bq/mL of the initial concentration to 2777 Bq/mL of the final concentration. In the experiment, 140 mL of tritium-containing water was used, and thus it was found that about 45920 Bq of tritium was absorbed and separated from the tritium-containing water by the membrane electrode containing 0.24 g of absorbent. In addition, the tritium radioactive concentration in 7 mL of dilute nitric acid was 113 Bq/mL as the final concentration of the experiment. This tritium corresponding to 791 Bq was eluted into the nitric acid solution.

The experimental results proved that acceptable performance for the absorption of tritium can be obtained even if the amount of dilute acid aqueous solution for supplying hydrogen ions into absorbent was as small as one-twentieth of that of tritium-containing water. Furthermore, continual absorption of tritium without elution of tritium can be obtained when a membrane electrode containing materials of relatively inexpensive metal such as stainless steel.

The experimental results reveal the possibility of tritiated hydrogen gas (HT) being produced from the experimental apparatus of the Example investigated using a device including a proportional counter for analyzing the hydrogen isotopomer concentration (HPTGM/PC-1, HPTGM/PHA, HPTGM/GC-1, and TPTGM/PCDT-S manufactured by ISO-SHIELD CO.). The proportional counter includes an aluminum cylinder (diameter: 8 cm, length: 50 cm) as the cathode (0 V) and a gold-plated tungsten-wire (diameter: 20 µm) as the anode (+1750 V). The device can analyze the waveform of the output voltage from the proportional counter for introducing the sample gas with the carrier gas under 900 kPa pressure conditions. This device can detect tritium having an extremely low concentration (the detection limit is about 1 Bq/L) and can distinguish between the signal indicating tritium and the signal indicating external radiations such as cosmic rays. Such capability is revealed from the analysis of the difference in wave intensity (Energy) and rise time. In general, the analysis of HT using mass chromatography as the most common method to analyze trace components in air is difficult due to the equal mass of +4 for HT with helium ($^4$He) in air under the low concentration. By contrast, this device can detect HT or HTO with high sensitivity on the measurement principle using the radioactivity of tritium. In the analysis of the Example, the reaction container (5.8×5.8×5.8 cm$^3$) as shown in FIG. 4(b) in which an acrylic container unit including a membrane electrode is immersed in 140 mL of tritium-containing water at an initial concentration of 5450 Bq/mL was additionally placed in a sealed acrylic container (7.8×7.8×7.8 cm$^3$). Then, a carrier gas (methane: 10%; argon: 90%; flow rate: 300 mL/min) was introduced into the sealed acrylic container, and a mixed gas of the sample gas transpired in the head space of the sealed acrylic container and the carrier gas was introduced into the proportional counter through a molecular sieve (3A1/16, 134-06095, manufactured by WAKKO PURE CHEMICAL IND.) which was placed (length: 12 cm) into a Pyrex (registered trademark) glass tube (length: 50 cm, outer diameter: 9 mm; inner diameter: 8 mm) for dehydration of the mixed gas. In the present experiment, the integrated signal from the device was analyzed by introducing the mixed gas into the proportional counter for 50000 seconds.

FIG. 5(b) illustrates a particular curve corresponding to tritiated gas detected in the present experiment. The results in FIG. 5(b) indicate the possibility that the curve originated from not only tritiated hydrogen (HT), but also from tritiated water (HTO) though dehydration of the sample gas performed using the molecular sieve. The results confirmed with high possibility that the separated tritium from water is converted into tritiated hydrogen (HT) or tritiated water (HTO) by the present membrane electrode for absorbing tritium.

Example 3

Experiment for absorbing and recovering tritium from tritium-containing water using membrane electrode including hydrogen ion-containing manganese oxide and Nafion (registered trademark) film—No. 1

In this Example, the reaction system illustrated in FIG. 6(a) was constructed, and an experiment for absorbing and separating tritium from water was performed using a membrane electrode having one surface coated with a Nafion (registered trademark) film. In parallel with the above experiment, the recovery of tritium was conducted by collecting air in the head space of the reaction container into distilled water ($H_2O$) placed in a gas-washing bottle by suction using a vacuum pump.

In the experiment, the reaction system as shown in FIG. 6(a) was constructed. A container contains a transparent acrylic resin, and the container is partitioned into two tanks by a membrane electrode containing a lithium ion-containing manganese oxide absorbent. To prevent water leaks, gaps in the acrylic tank were sealed with a silicone adhesive (Basukoku, manufactured by CEMEDINE CO., LTD.) and dried for 2 days. The reaction container was designed to share the head space inside the reaction container, through which tritium-containing water and a dilute nitric acid solution were introduced into each tank. This design provides an equal static water pressure applied to each surface of the membrane electrode partitioning both tanks when air-flow is provided from the outside of the reaction container. To fabricate the membrane electrode of this Example, the methods for preparation of lithium ion-containing manganese oxide having a spinel crystal structure as a precursor to obtain hydrogen ion-containing manganese oxide having a spinel crystal structure, calcinations, purification, and storage described in Example 1 were used. To prepare a membrane electrode in this Example, 0.84 g of the lithium ion-containing manganese oxide was fixed on a stainless steel-wire mesh (SUS304, 100 meshes, length: 6 cm, width: 3 cm, thickness: 0.16 cm) using a conductive coating as a binder, with methods similar to the methods described in Example 1. In addition, a dispersion of Nafion (registered trademark) at a concentration of 20% (WAKO PURE CHEMICAL IND., LTD.) was uniformly applied on one side of the membrane electrode, and dried at 60° C. for 2 hours in the atmospheric air. This operation of Nafion (registered trademark) applied to the surface and dried was conducted two times. Finally, the resultant Nafion (registered trademark) was applied on one side of the membrane electrode as a hydrogen-ion conductive film with heating at 120° C. for one hour in the atmospheric air. The thickness of the membrane electrode after the drying was about 1.2 mm.

Next, an acid treatment of the membrane electrode was conducted in the reaction system illustrated in FIG. 6(a). In the acid treatment, each 200 mL portion of 0.5 M dilute nitric acid solution was introduced into each tank, and then the 0.5 M dilute nitric acid solution was left to stand for 1 hour, to elute lithium ions from lithium ion-containing manganese oxide in the membrane electrode to the 0.5 M dilute nitric acid solution. This acid treatment changes the form of lithium ion-containing manganese oxide to the form of hydrogen ion-containing manganese oxide. Finally, the 0.5 M dilute nitric acid solution was removed from each tank, and additionally the inside surface of each tank was rinsed by distilled water (200 mL each), which was left to stand for 1 hour to remove the contamination with a 0.5 M dilute nitric acid solution.

In the preparation of tritium-containing water, a standard reagent of tritium ($^3H$, water, manufactured by PERKIN ELMER) was diluted with 200 mL of distilled water (WAKO PURE CHEMICAL IND., LTD.) at room temperature, and tritium-containing water for the experiment having a radioactive concentration of 4918.9 Bq/mL was prepared. Then, the tritium-containing water (200 mL) was introduced into the right tank in the reaction system as shown in FIG. 6(a), and a 0.5 M concentration of nitric acid aqueous solution (200 mL) (WAKO PURE CHEMICAL IND., LTD) was introduced into the left tank. In that case, the reaction surface coated with Nafion (registered trademark) was placed toward the dilute nitric acid aqueous solution, and the reaction surface which exposed hydrogen ion-containing manganese oxide having a spinel crystal structure was placed toward the tritium-containing water. The changes in the tritium radioactive concentration in such solutions as the tritium-containing water, the 0.5 M nitric acid aqueous solution, and distilled water 50 mL) placed in a gas-washing bottle were measured using a liquid scintillation counter, as in examples 1 and 2. A pH meter (F-55, glass electrode type 6378-10D manufactured by HORIBA CO.) and a pH test paper were used for monitoring the pH and the temperature of the tritium-containing water. The membrane electrode was electrically grounded through a copper wire.

[Chem. 2]

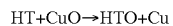

$$HT + CuO \rightarrow HTO + Cu \quad (5)$$

Next, the initial pH of the tritium-containing water for the experiment was adjusted to 9.5 by adding a 0.1 M or 0.5 M aqueous solution of reagent sodium hydroxide, and thereafter the tritium-containing water was continuously stirred using a magnetic stirrer and a stirring bar coated with Teflon (registered trademark) resin. The temperature of tritium-containing water was about 16° C. Unlike Examples 1 and 2, the experiment in this Example focused on observing and measuring the changes in the radioactive concentration of tritium and in the pH over about 88 hours without adding alkaline reagent after the initial pH adjustment. Each sample (1.2 mL) of the tritium-containing water for the experiment and the 0.5 M dilute nitric acid aqueous solution was collected by filtration using a disposable filter (DISMIC-25AS manufactured by ADVANTEC) and a disposable syringe (SS-02SZP, manufactured by TERMO) every after a predetermined time. Finally, a 1.0 mL portion of each sample was separated from a 1.2 mL portion of each sample using a precise micropipette, and the changes in the radioactive concentration were measured using a liquid scintillation counter. Moreover, in this Example as illustrated in FIG. 6(a), the head space air in the reaction container including the membrane electrode contacted with tritium-containing water was introduced into distilled water placed in the gas-washing bottle (Walter type, volume: 100 mL)

using a small size vacuum pump (EP-01, manufactured by ADVANTEC. CO), through 0.2 g of a molecular sieve (3A1/16, 134-06095, manufactured by WAKKO PURE CHEMICAL IND., LTD) contained (length: 12 cm) and 0.1 g of copper mono oxide powder (CuO, 038-13191, manufactured by WAKKO PURE CHEMICAL IND., LTD) placed into a Pyrex (registered trademark) glass tube (outer diameter: 9 mm, inner diameter: 8 mm). The CuO powder was fixed in the glass tube using a glass wool (fine: 2-6 µm, coarse: 4-9 µm, manufactured by TOSO, CO), and the temperature was heated at 400° C. using a heater (Type-CL, 100V, 60W, manufactured by DAIKA DENKI) and a controller (TC-3000, manufactured by ASONE. CO). In addition, a buffer chamber was connected to the reaction system to decrease the pulse of air produced by pumping. In general, it is well known that copper mono-oxide (CuO) oxidizes hydrogen gas into water at 250° C. or more, and the molecular sieve absorbs water but absorbs no hydrogen gas. The results thus reveal that the tritiated hydrogen gas passing the molecular sieve is oxidized and converted to tritiated water (HTO) according to chemical formula (5).

Figure 7A:
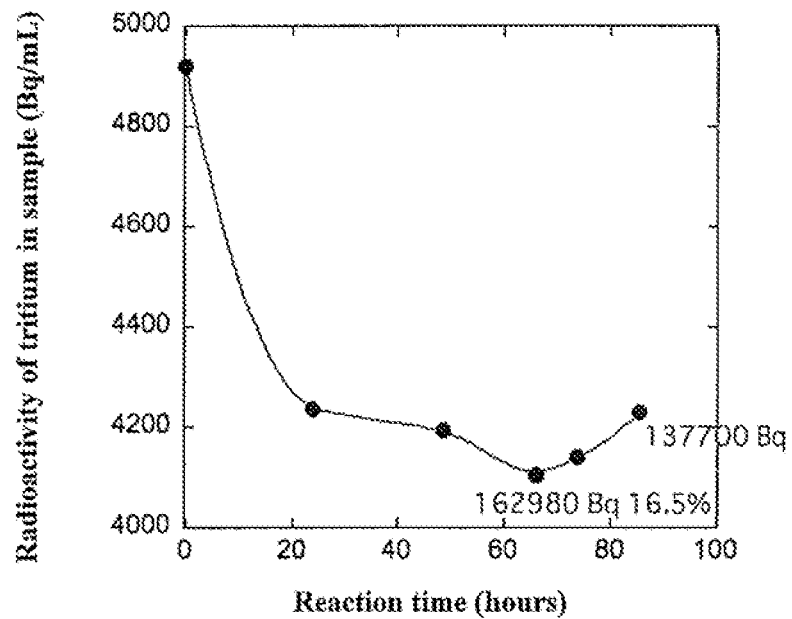
FIG. 7(a) is a graph showing changes in the tritium concentration in samples collected from tritium-containing water using the membrane electrode in the reaction container in a working example.
Figure 7B:
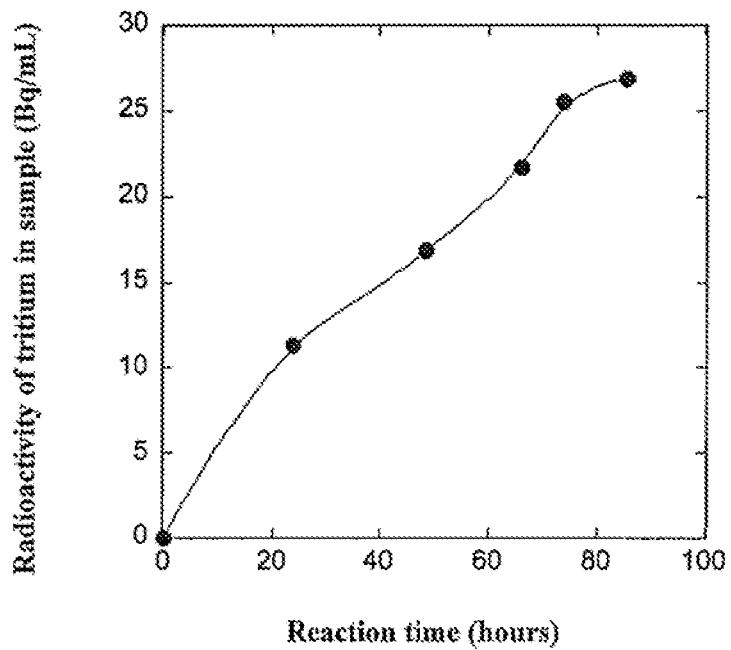
FIG. 7(b) is a graph showing changes in the tritium concentration in samples collected from a dilute nitric acid solution using the membrane electrode in a working example.
Figure 7C:
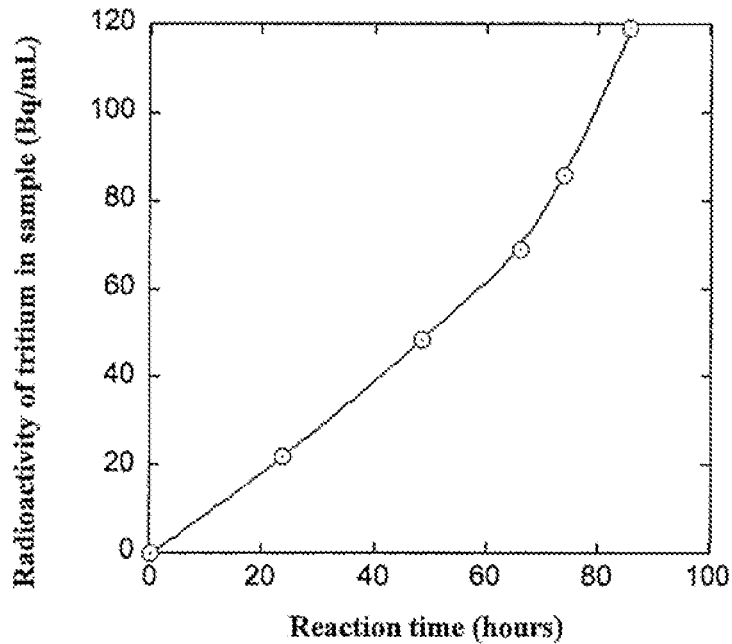
FIG. 7(c) is a graph showing changes in the tritium concentration in samples collected from water placed in the gas-washing bottle in the reaction container in a working example.

The experimental results are shown in FIGS. 7(a) to 7(d). FIG. 7(a) illustrates changes in the radioactive concentration of tritium in tritium-containing water. The vertical axis indicates the radioactive concentration of tritium, and the horizontal axis indicates the reaction time. It is observed that the initial radioactive concentration of 4918.9 Bq/mL of tritium in the tritium-containing water (200 mL) was continually decreased until the reaction time of 66 hours elapsed, and the concentration of tritium subsequently moderately increased until 88 hours. By using the membrane electrode for absorbing and separating tritium, the tritium amount decreased in the reaction time of 66 hours was determined to be 162980 Bq corresponding to 16.5% of the initial amount in the tritium-containing water. Further, 137700 Bq of tritium was absorbed and separated over 88 hours. FIG. 7(b) illustrates changes in in the radioactive concentration of tritium in the dilute nitric acid aqueous solution (200 mL). This result indicates that the amount of 4342 Bq of tritium was transferred into the dilute nitric acid aqueous solution over the reaction time of 74 hours. FIG. 7(c) illustrates changes in the radioactive concentration of tritium in distilled water (50 mL) placed in a gas-washing bottle. This result indicates that the amount of 3235 Bq was recovered into the distilled water until 74 hours elapsed. However, the results shown in FIGS. 7(b) and 7(c) indicate that total amount of tritium detected in the distilled water (50 mL) and the dilute nitric acid aqueous solution (200 mL) is only about 4.6% of the amount of tritium decreased in the tritium-containing water as shown in FIG. 7(a). The reason for this is considered to be an incorrect mass-balance when the head space air was introduced into the Pyrex (registered trademark) glass tube from the reaction container, and tritium in the head space air was adsorbed as HTO with the molecular sieve. In a past report, the obviously detected oxygen atoms (O) and oxygen gas ($O_2$) in the head space of the suspension of a manganese oxide powder and water have been reported. For example, the evolution of isotope oxygen ($^{18}O$) and ($^{18}O_2$) has been reported when a manganese oxide powder was suspended in isotope water ($H_2^{18}O$) in H. Koyanaka, K. Takeuchi and, Alexander I. Kolesnikov, Proton and electron charge with oxygen evolution form split water by a nano manganese dioxide, Electrochemistry, conference proceedings, 1A32, (2013), and H. Koyanaka, K. Takeuchi, and A. I. Kolesnikov, "Conversion of $CH_4$ into $H_2$ at 300° C. using $Pd/MnO_2$ catalyst made with an effect of water oxidation", ECS Transactions, vol. 58, Issue 36, pp. 81-85, (2014).

Figure 6B:
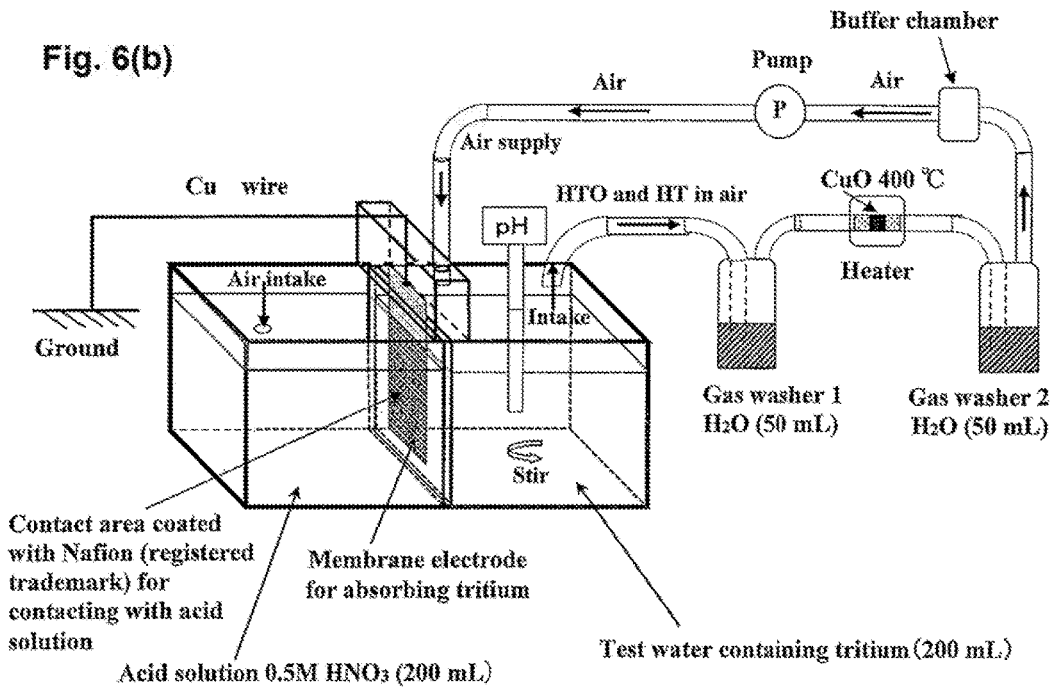
FIG. 6(b) illustrates a system container according to one embodiment for absorbing tritium from tritium-containing water using a membrane electrode and for recovering tritium into water placed in gas-washing bottles by suction and circulation of tritium-containing air from the head space of the reaction container.
Figure 7D:
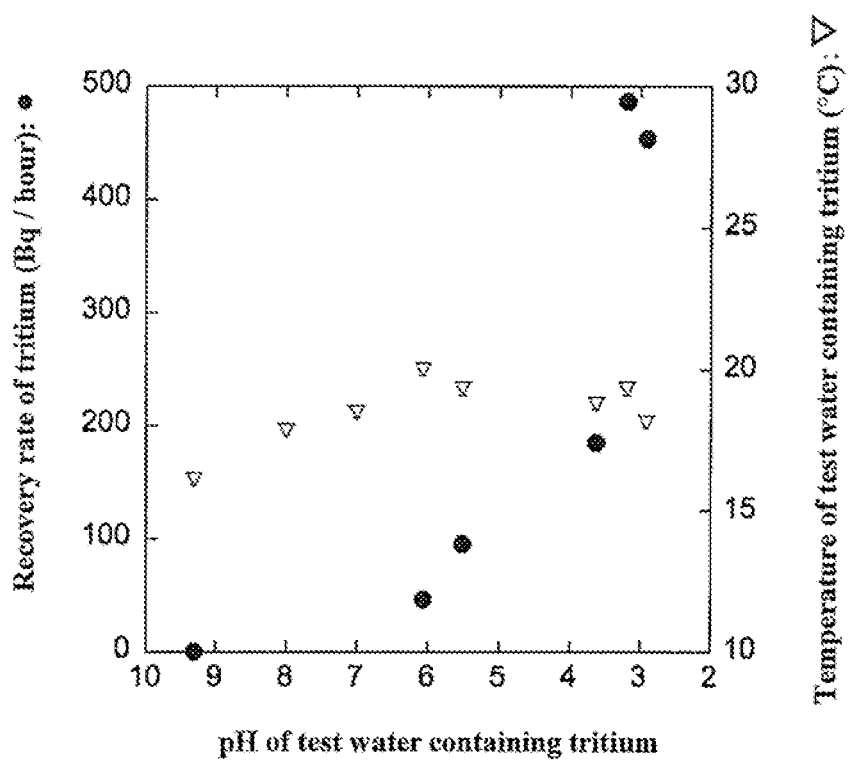
FIG. 7(d) is a graph showing changes in the recovery yield of tritium that depends on the pH of tritium-containing water.

Accordingly, it is considered that a tritium collected into the present membrane electrode is converted to tritiated hydrogen gas (HT) and then reacts with oxygen (O or $O_2$) to produce tritiated water (HTO). This reaction enables HTO to be transpired into air in the head space inside the reaction container from the interface of solid-liquid-gas containing the membrane electrode, tritium-containing water, and air in the head space of the reaction container. In the following Example 4, the air in the head space inside the reaction container was directly introduced into a gas-washing bottle without contact with a molecular sieve as shown in FIG. 6(b), to prove the hypothesis of the mechanism described above. In addition, the Example focused on investigating the dependence of the recovery yield of tritium on the pH of tritium-containing water. FIG. 7(d) illustrates changes in the recovery yield of tritium collected into distilled water (50 mL) placed in the gas-washing bottle shown in FIG. 6(b) and changes in the temperature of tritium-containing water. The left side vertical axis in FIG. 7(d) indicates the recovery yield of tritium, meaning the amount of tritium collected into the distilled water (50 mL) per unit time. The right side vertical axis in FIG. 7(d) indicates the temperature of tritium-containing water. During the experiment over 88 hours, the temperature was maintained at 15 to 20° C. The recovery yield of tritium was significantly increased under an acidic pH condition in tritium-containing water. By contrast, a lower recovery yield of tritium under an alkaline pH condition was observed in tritium-containing water than that under acidic condition. These results suggest that when the membrane electrode according to the embodiment of the present invention is brought into contact with tritium-containing water, the membrane electrode absorbs tritium as tritium ions ($T^+$) under an alkaline pH condition, and releases tritium as HTO gas from the membrane electrode. The results in FIG. 7(a) reveal that the increase in the radioactive concentration of tritium after the reaction time of 66 hours is based on the re-dissolution of tritium released as HTO from the membrane electrode that has absorbed tritium into tritium-containing water under such pH conditions at 66 and 88 hours as 3.63 and 2.89.

The experimental results clarify that the pH of tritium-containing water is preferably adjusted to 6 or more and 9 or less (i.e., from weak acidity to alkalinity) for absorbing tritium enough. Furthermore, the recovering of tritium as HT or HTO from the air in the head space of the reaction container is suitable to separate tritium from water and to recover tritium when the pH of tritium-containing water preferably decreased to 5 or less and 2 or more (i.e., from weak acidity to acidity).

Example 4

Experiment for absorbing and recovering tritium from tritium-containing water using membrane electrode including hydrogen ion-containing manganese oxide and Nafion (registered trademark) film—No. 2

In this Example, the reaction system illustrated in FIG. 6(b) was constructed in the experiment for absorbing and separating of tritium from water using a membrane electrode having one surface coated with a Nafion (registered trademark) film. In the reaction system, the recovery of tritium was conducted by directly introducing the air from the inside head space of the reaction container into distilled water ($H_2O$) placed in a gas-washing bottle through suction of the air using a vacuum pump. For circulating gas existing inside the reaction container, the exhausted gas from the gas-washing bottle was introduced into a Pyrex (registered trademark) glass tube, to contact with 0.1 g of copper mono-oxide (CuO) powder, which was heated at 400 C. Further, the gas after contacted with the CuO was introduced into a secondary gas-washing bottle, and was returned into the reaction container from the upper part. During the experiment, an atmospheric pressure condition inside the reaction container was maintained by introducing air from an intake on the upper part of the reaction container, to prevent a negative pressure condition produced from the circulating gas in the reaction system. In the Example, the membrane electrode including a hydrogen ion-containing manganese oxide having one side of the membrane surfaces coated with a Nafion (registered trademark) film was fabricated and used, as in Example 3. In addition, in the present experiment of Example 4, the pH control was performed as follows; the initial pH was adjusted to 9.36 as alkalinity, and naturally decreased to 4 or less. After that, the pH was increased to 8.10 by adding an alkaline reagent, and naturally decreased to 5 or less. The results obtained confirm the effects on the tritium absorption or separation under alkalinity and the tritium release or recovery using the membrane electrode according to the embodiment of the present invention under the pH control described above.

For the experiment, the reaction system was constructed as shown in FIG. 6(b). In this apparatus, the reaction container contains a transparent acrylic resin, and the tank is partitioned into two tanks by a membrane electrode containing lithium ion-containing manganese oxide absorbent. To prevent water leaks, gaps in the acrylic tank were sealed with a silicone adhesive (Basukoku manufactured by CEMEDINE CO., LTD.) and dried for 2 days. The reaction container was designed to share the head space inside the reaction container, which introduced tritium-containing water and a dilute nitric acid solution into each tank. This design provides an equal static water pressure applied to each surface of the membrane electrode partitioning both tanks when an air-flow provided from the outside of the reaction container. To fabricate the membrane electrode of this Example, the methods described in Example 1 for preparation of lithium ion-containing manganese oxide having a spinel crystal structure as a precursor to obtain hydrogen ion-containing manganese oxide having a spinel crystal structure, calcinations, purification, and storage were used. To prepare a membrane electrode in this Example, 0.83 g of the lithium ion-containing manganese oxide was fixed on a stainless steel-wire mesh (SUS304, 100 meshes, 6 cm×3 cm×0.16 cm) using the conductive coating as a binder, with methods similar to the methods described in Example 1. In addition, a dispersion of Nafion (registered trademark) at a concentration of 20% (WAKO PURE CHEMICAL IND., LTD.) was uniformly applied on one side of the membrane electrode, and dried at 60° C. for 2 hours in the atmospheric air. This operation of Nafion (registered trademark) applied to the surface and dried was performed twice. Finally, the resultant Nafion (registered trademark) was applied on one side of the membrane electrode as a hydrogen-ion conductive film with heating at 120° C. for one hour in the atmospheric air. The thickness of the membrane electrode after the drying was about 1.3 mm.

Next, an acid treatment of the membrane electrode was conducted in the reaction system illustrated in FIG. 6(b). In the acid treatment, each 200 mL of 0.5 M dilute nitric acid solution was introduced into each tank, and then the 0.5 M dilute nitric acid solution was left to stand for 1 hour, to elute lithium ions from lithium ion-containing manganese oxide in the membrane electrode to the 0.5 M dilute nitric acid solution. This acid treatment changes the form of lithium ion-containing manganese oxide to the form of hydrogen ion-containing manganese oxide. Finally, the 0.5 M dilute nitric acid solution was removed from each tank, and additionally the inside surface of each tank was rinsed by distilled water (200 mL each), which was left to stand for 1 hour to remove the contamination with a 0.5 M dilute nitric acid solution.

In the preparation of tritium-containing water, a standard reagent of tritium ($^3H$, water, manufactured by PERKIN ELMER) was diluted with 200 mL of distilled water (WAKO PURE CHEMICAL IND., LTD.) at room temperature, and tritium-containing water for the experiment having a radioactive concentration of 4408.7 Bq/mL was prepared. Then, the tritium-containing water (200 mL) was introduced into the right tank in the reaction container as shown in FIG. 6(b), and a 0.5 M concentration of nitric acid aqueous solution (200 mL) (WAKO PURE CHEMICAL IND., LTD) was introduced into the left tank. In that case, the reaction surface coated with Nafion (registered trademark) was placed toward the dilute nitric acid aqueous solution, and the reaction surface which exposed hydrogen ion-containing manganese oxide having a spinel crystal structure was placed toward the tritium-containing water. In this experiment, the changes in the tritium radioactive concentration in such solutions as the tritium-containing water, the 0.5 M nitric acid aqueous solution, and distilled water 50 mL each) placed in two gas-washing bottles were measured using a liquid scintillation counter, as in examples 1, 2, and 3. A pH meter (F-55, glass electrode type 6378-10D manufactured by HORIBA CO.) and a pH test paper were used for monitoring the pH and the temperature of the tritium-containing water. The membrane electrode was electrically grounded through a copper wire.

Next, the initial pH of the tritium-containing water for the experiment was adjusted to 9.36 by adding a 0.1 M or 0.5 M aqueous solution of reagent sodium hydroxide (WAKO PURE CHEMICAL IND., LTD). The temperature of tritium-containing water was about 15.7° C. In this Example, the the pH of the tritium-containing water was increased to 8.10 by adding the alkaline reagent when the pH decreased to 4.0 or less after 6 hours from the initial pH adjustment. The experiment was continued for 50 hours until the pH decreased to 5 or less, to investigate the changes in the radioactive concentration of tritium in each solution.

Each sample (1.2 mL) of the tritium-containing water for the experiment, the 0.5 M dilute nitric acid aqueous solution, and distilled water in two gas-washers were collected by filtration using a disposable filter (DISMIC-25AS manufactured by ADVANTEC) and a disposable syringe (SS-02SZP, manufactured by TERMO) every time when a predetermined pH in tritium-containing water was observed. Finally, a 1.0 mL portion of each sample was separated from a 1.2 mL portion of each sample using a precise micropipette, and the changes in the radioactive concentration were measured using a liquid scintillation counter. In this Example as illustrated in FIG. 6(b), the air in the head space of the reaction container including the tritium-containing water was directly introduced into 50 mL of distilled water (WAKO PURE CHEMICAL IND., LTD.) placed in the gas-washing bottle (Walter type, volume: 100 mL) using a small size vacuum pump (EP-01, manufactured by ADVANTEC. CO). Further, the exhausted gas from the gas-washing bottle was introduced into a Pyrex (registered trademark) glass tube (outer diameter: 9 mm, inner diameter: 8 mm) to contact with 0.1 g of copper mono-oxide powder (CuO, 038-13191, manufactured by WAKKO PURE CHEMICAL IND., LTD). The powder of CuO was fixed with a glass wool in the Pyrex (registered trademark) glass tube and heated at 400° C. using a heater as in Example 3. Finally, the exhausted gas after contacted with the CuO was introduced into 50 mL of distilled water (WAKO PURE CHEMICAL IND., LTD.) placed in an additional gas-washing bottle (Walter type, volume: 100 mL). A buffer chamber was connected to the reaction system to decrease the pulse of air produced by pumping, as in Example 3.

Figure 8A:
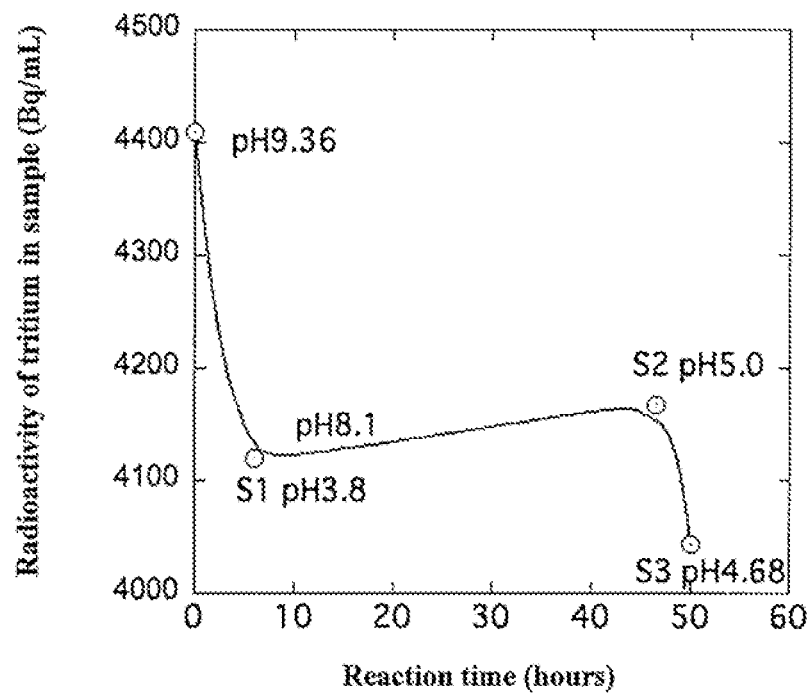
FIG. 8(a) is a graph showing changes in the tritium concentration in samples collected from tritium-containing water using the membrane electrode in the reaction container in a working example.

The experimental results are shown in FIG. 8(a) to (d). FIG. 8(a) illustrates changes in in the radioactive concentration of tritium in tritium-containing water. The vertical axis indicates the radioactive concentration of tritium, and the horizontal axis indicates the reaction time. It is observed that the initial radioactive concentration of 4408.7 Bq/mL of tritium in the tritium-containing water (200 mL) was continually decreased until the reaction time of 6 hours elapsed, and the concentration of tritium subsequently moderately increased until 46.5 hours. Finally, the radioactive concentration of tritium was decreased to 4044.0 Bq/mL at the reaction time of 50 hours when the pH of the tritium-containing water decreased to 4.68. The gross amount of tritium decreased over the reaction time of 50 hours was estimated to be 71116.5 Bq from the difference in the initial and final concentration in the tritium-containing water.

Figure 8B:
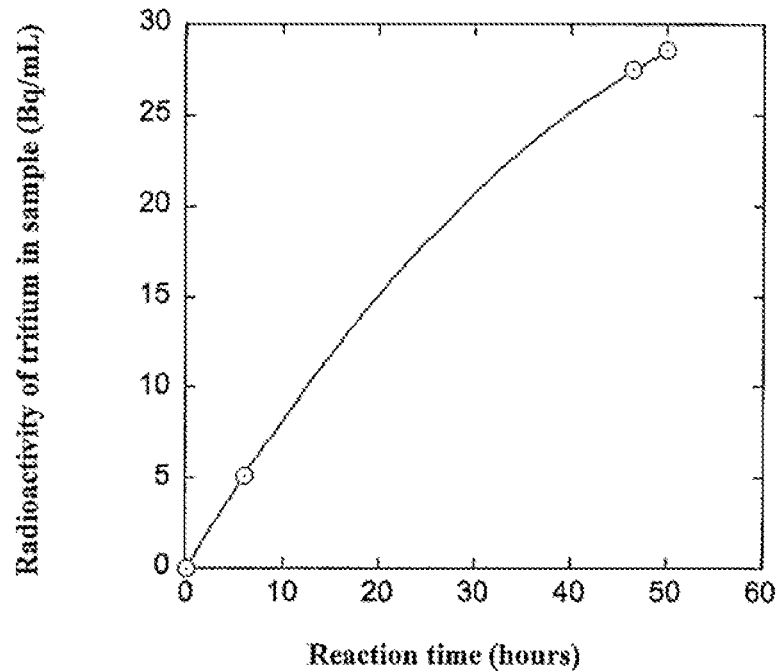
FIG. 8(b) is a graph showing changes in tritium concentration in samples collected from a dilute nitric acid solution using the membrane electrode in a working example.
Figure 8C:
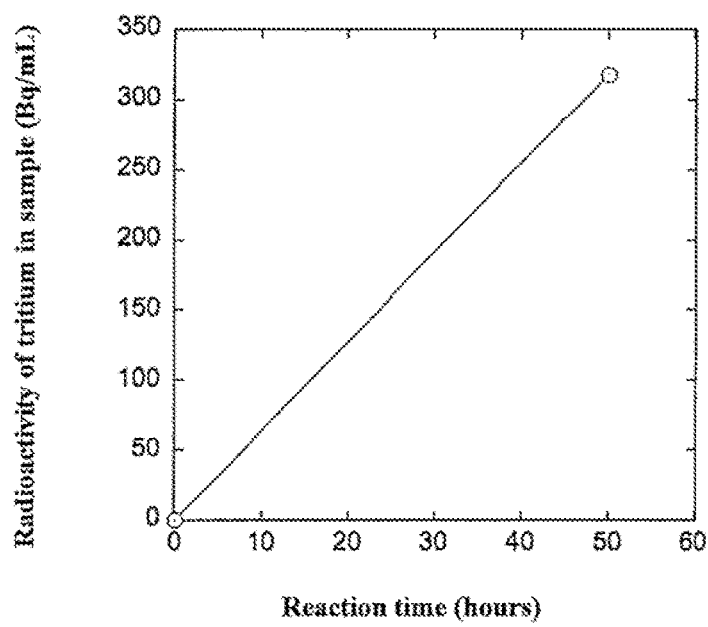
FIG. 8(c) is a graph showing changes in tritium concentration in samples collected from water placed in the gas-washing bottle-1 in the reaction container in a working example.

FIG. 8(b) illustrates changes in in the radioactive concentration of tritium in the dilute nitric acid aqueous solution (200 mL). This result indicates that the amount about 5881.3 Bq of tritium was transferred into the dilute nitric acid aqueous solution over the reaction time of 50 hours. FIG. 8(c) illustrates changes in in the radioactive concentration of tritium in distilled water (50 mL) placed in the first gas-washing bottle. This result indicates that the amount of 15885 Bq was recovered into the distilled water until 50 hours elapsed. This amount of tritium recovered was five times larger than that of 3235 Bq of tritium recovered at the reaction time of 74 hours in Example 3, which was detected in distilled water placed in the gas-washing bottle introduced gas after contacted with a molecular sieve.

Figure 8D:
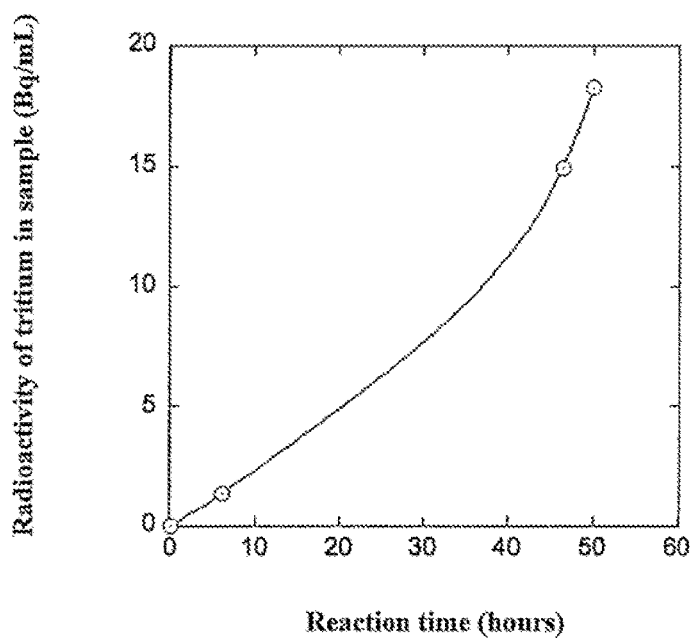
FIG. 8(d) is a graph showing changes in tritium concentration in samples collected from water placed in the gas-washing bottle-2 in the reaction container in a working example.

FIG. 8(d) illustrates changes in in the radioactive concentration of tritium in distilled water (50 mL) placed in a secondary gas-washing bottle in the reaction system shown in FIG. 6(b). This result indicates that 839.5 Bq of tritium was recovered into distilled water (50 mL) placed in the secondary gas-washing bottle until 50 hours elapsed. The results described above reveal that the total amount of tritium recovered into distilled water placed in gas-washing bottles and the dilute nitric acid solution is determined to be 22605.8 Bq over the reaction time of 50 hours. In contrast with this total amount, the decreased tritium amount estimated from the decrease in the concentration of tritium in FIG. 8(a) is 71116.5 Bq. Thus, 31.8% of tritium as the gross amount can be recovered, in comparison with the total amount of tritium decreased in the tritium concentration. It is considered that the remaining tritium of about 68.2% adhered as fine drops of water inside the upper wall of the tank containing the tritium-containing water was observed in the progress of experiment, because such adhesion obstructs the tritium collection into distilled water placed in the gas-washing bottles. The marked adhesion of water drops inside the upper wall of the tank was observed when the pH of the tritium-containing water was decreased to acidity from the initial alkalinity, as in the experiment in Example 3. The adhesion of water drops was not observed inside the upper wall of the tank containing a dilute acid solution. The marked adhesion of water drops observed inside the upper wall of the head space in the tank of tritium-containing water can be considered to originate from the growth of tritiated water molecules (HTO) as the nuclear to form a drop of water.

The method for recovering tritium into a small amount of distilled water using the effects of this membrane electrode for absorbing tritium and the suction with a pump shown in this Example is not limited. An existing material with a high absorptive capacity for hydrogen and water can be used instead of distilled water in this Example as a technique for recovering tritium carried from a liquid phase to a vapor phase as HT and HTO.

As described above, the membrane electrode according to the embodiment of the present invention simply and inexpensively enables the separation and recovery of tritium present at an extremely low mass-concentration of several nano-grams per liter level from water, which has been impossible using conventional techniques.

The invention claimed is:

1. A membrane electrode for absorbing tritium to separate and trap tritium from tritium-containing water, the membrane electrode comprising:
    a manganese oxide having a spinel crystal structure and containing hydrogen ions or lithium ions fixed on both surfaces of a conductive material to form a membrane electrode body; and
    a hydrogen-ion conductive film coated on one side surface the membrane electrode body.

2. A method for separating tritium from water, comprising:
    bringing tritium-containing water in contact with the membrane electrode according to claim 1; and
    supplying hydrogen ions to the hydrogen-ion conductive film coated on one side of the membrane electrode body, to separate and trap tritium from the tritium-containing water.

3. The method for separating tritium from water according to claim 2, wherein
    the tritium-containing water brought in contact with the membrane electrode has a pH range from weak acidity to alkalinity.

4. The method for separating tritium from water according to claim 2, wherein
    the hydrogen ions are supplied through contacting with dilute acid.

5. The method for separating tritium from water according to claim 2, further comprising:
    when obtained tritium radioactivity concentration does not reach the reference value, circulating the tritium-containing water brought in contact with the membrane electrode to bring the tritium-containing water into contact with the membrane electrode repeatedly until tritium radioactivity concentration reaches a value equal to or less than reference value.

6. A method for separating and recovering tritium from water, comprising:
    the steps included in the method according to claim 2; and
    bringing the membrane electrode trapping tritium into contact with at least one acidic water selected from the group consisting of $H_2O$, HDO, and $D_2O$ to release tritium.

7. A method for separating and recovering tritium from water, comprising:
    the steps included in the method according to claim 2; and
    bringing the membrane electrode trapping tritium into contact with at least one acidic water selected from the group consisting of $H_2O$, HDO, and $D_2O$ to recover tritium by causing the tritium to evaporate as at least one isotopomer of water selected from a group consisting of HTO, DTO, and $T_2O$ or a hydrogen gas HT.

* * * * *